United States Patent
Hagiwara

(10) Patent No.: US 12,025,294 B2
(45) Date of Patent: Jul. 2, 2024

(54) LIGHT SOURCE DEVICE

(71) Applicant: USK TECHNOLOGY CO., LTD., Mie (JP)

(72) Inventor: Mamoru Hagiwara, Mie (JP)

(73) Assignee: USK TECHNOLOGY CO., LTD., Mie (JP)

( * ) Notice: Subject to any disclaimer, the term of this patent is extended or adjusted under 35 U.S.C. 154(b) by 0 days.

(21) Appl. No.: 17/917,093

(22) PCT Filed: Apr. 9, 2020

(86) PCT No.: PCT/JP2020/016807
§ 371 (c)(1),
(2) Date: Oct. 5, 2022

(87) PCT Pub. No.: WO2021/205671
PCT Pub. Date: Oct. 14, 2021

(65) Prior Publication Data
US 2023/0151949 A1    May 18, 2023

(51) Int. Cl.
*F21V 19/00*    (2006.01)
*F21Y 105/10*    (2016.01)
*F21Y 115/10*    (2016.01)

(52) U.S. Cl.
CPC ......... *F21V 19/001* (2013.01); *F21Y 2105/10* (2016.08); *F21Y 2115/10* (2016.08)

(58) Field of Classification Search
CPC .. F21Y 2103/10; F21Y 105/10; F21Y 115/10; F21S 43/14; F21S 43/15; F21S 43/31; F21V 19/00
See application file for complete search history.

(56) References Cited

U.S. PATENT DOCUMENTS

| | | | |
|---|---|---|---|
| 6,454,437 B1 * | 9/2002 | Kelly | F21V 5/00 |
| | | | 362/246 |
| 10,828,382 B2 | 11/2020 | Asano | |
| 2003/0156416 A1 * | 8/2003 | Stopa et al. | F21V 21/00 |
| | | | 362/294 |
| 2018/0099061 A1 | 4/2018 | Asano | |
| 2018/0177908 A1 | 6/2018 | Ochi et al. | |
| 2019/0055139 A1 | 2/2019 | Ochi et al. | |

FOREIGN PATENT DOCUMENTS

| | | |
|---|---|---|
| JP | 2008-70865 | 3/2008 |
| JP | 2008-161095 | 7/2008 |
| JP | 2012-211984 | 11/2012 |
| JP | 2014-523650 | 9/2014 |
| JP | 5732157 | 6/2015 |
| JP | 2015-167512 | 9/2015 |

(Continued)

OTHER PUBLICATIONS

International Search Report issued in International Patent Application No. PCT/JP2020/016807, dated Jul. 14, 2020.

(Continued)

*Primary Examiner* — William J Carter
(74) *Attorney, Agent, or Firm* — Greenblum & Bernstein, P.L.C.

(57) ABSTRACT

A light source device includes plural light-emitting diodes arranged on a plane. A viewing angle of each of the light-emitting diodes is less than 50° or more than 80°.

9 Claims, 20 Drawing Sheets

(56) References Cited

FOREIGN PATENT DOCUMENTS

| | | |
|---|---|---|
| JP | 2017-64610 | 4/2017 |
| JP | 2017-104230 | 6/2017 |
| JP | 2018-34101 | 3/2018 |
| JP | 2018-61618 | 4/2018 |
| JP | 2019-34297 | 3/2019 |
| JP | 2019-72179 | 5/2019 |
| WO | 2007-100008 | 9/2007 |

OTHER PUBLICATIONS

International Preliminary Report on Patentability issued in International Patent Application No. PCT/JP2020/016807, dated Oct. 6, 2022.
Japanese Office Action in Japanese Counterpart Patent Application No. 2021-105217, dated Aug. 23, 2022.
Japanese Office Action in Japanese Counterpart Patent Application No. 2018-203282, dated Nov. 10, 2020.
Decision to Grant a Patent in Japanese Counterpart Patent Application No. 2018-203282, dated Apr. 20, 2021.
Japan Official Action received in JP Application No. 2022-514301, dated Aug. 22, 2023.

* cited by examiner

VIEWING ANGLE 20°

VIEWING ANGLE 20°

VIEWING ANGLE 140°

VIEWING ANGLE 140°

FIG. 3A
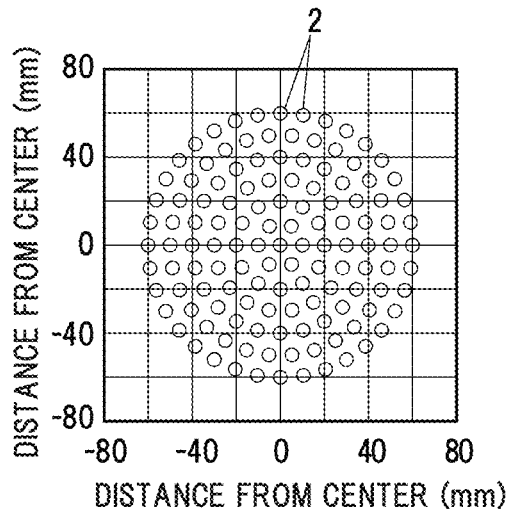
FIG. 3B
VIEWING ANGLE 20°
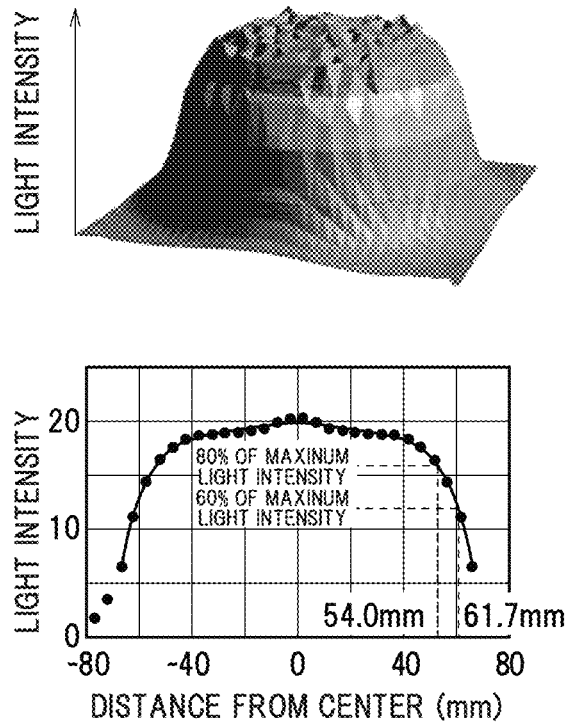
FIG. 3C
VIEWING ANGLE 50°
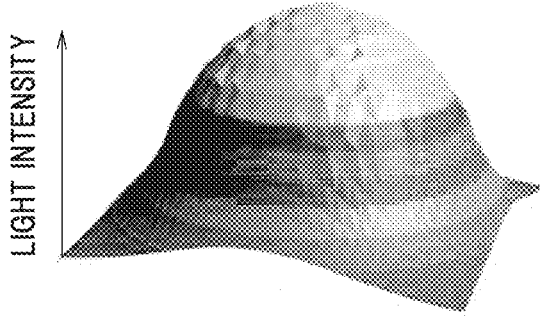
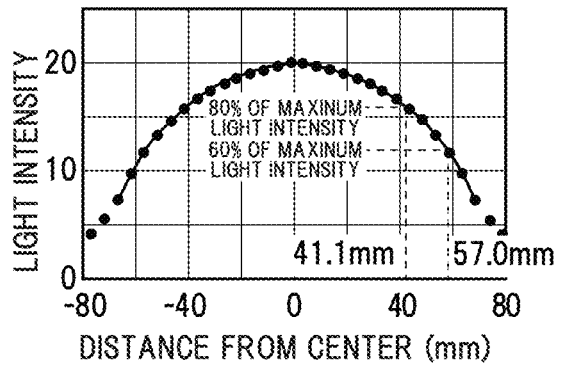
FIG. 3D
VIEWING ANGLE 140°
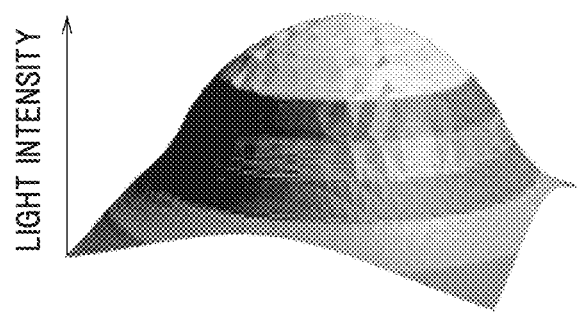
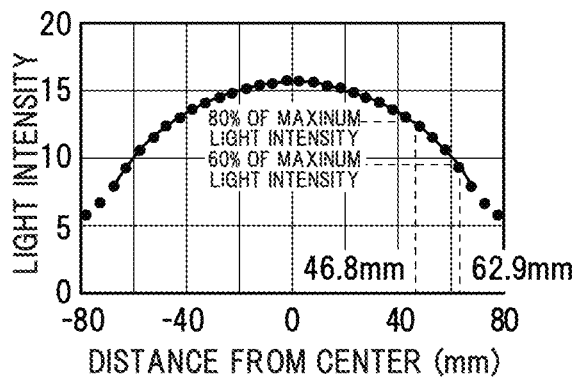

VIEWING ANGLE 20°
D=50mm

VIEWING ANGLE 20°
D=80mm

VIEWING ANGLE 20°
D=100mm

VIEWING ANGLE 20°
D=150mm

VIEWING ANGLE 20°
D=200mm

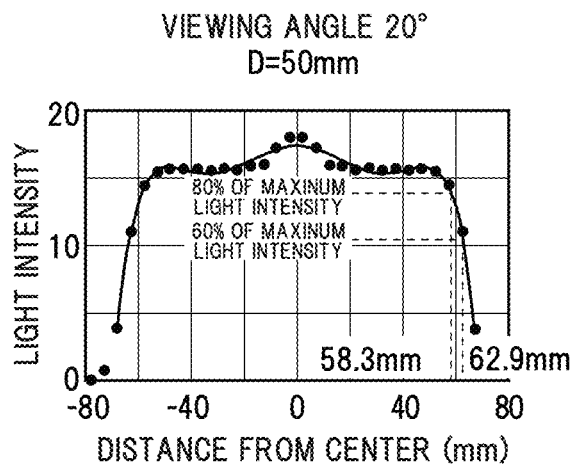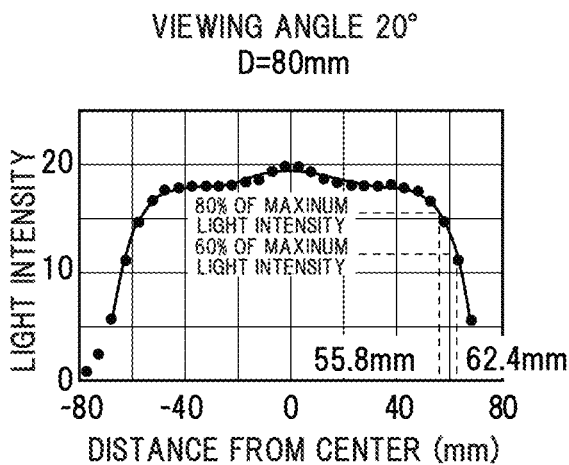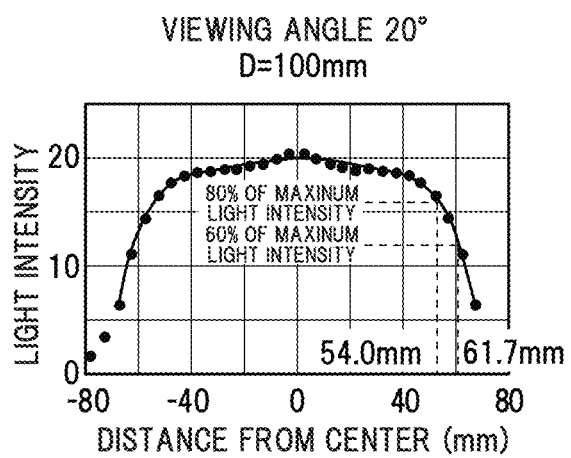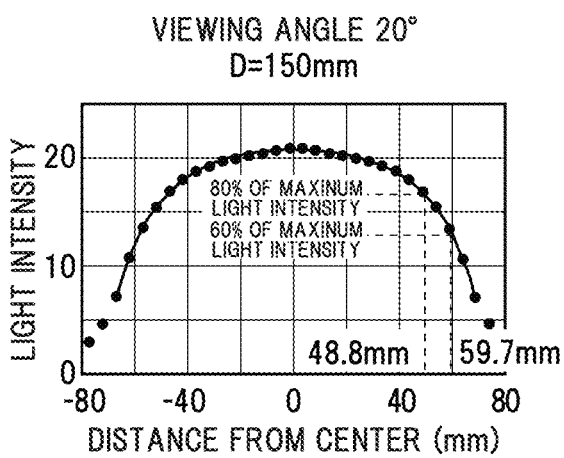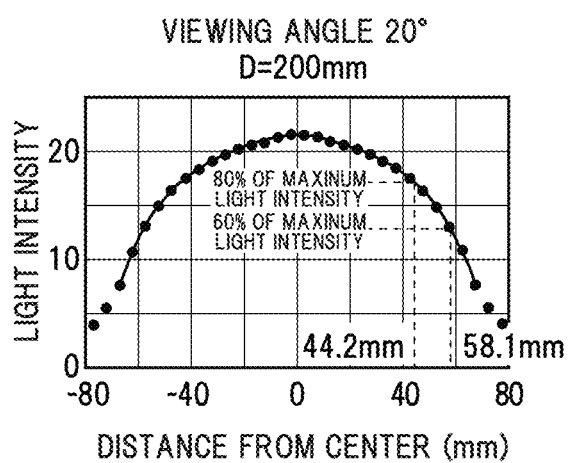

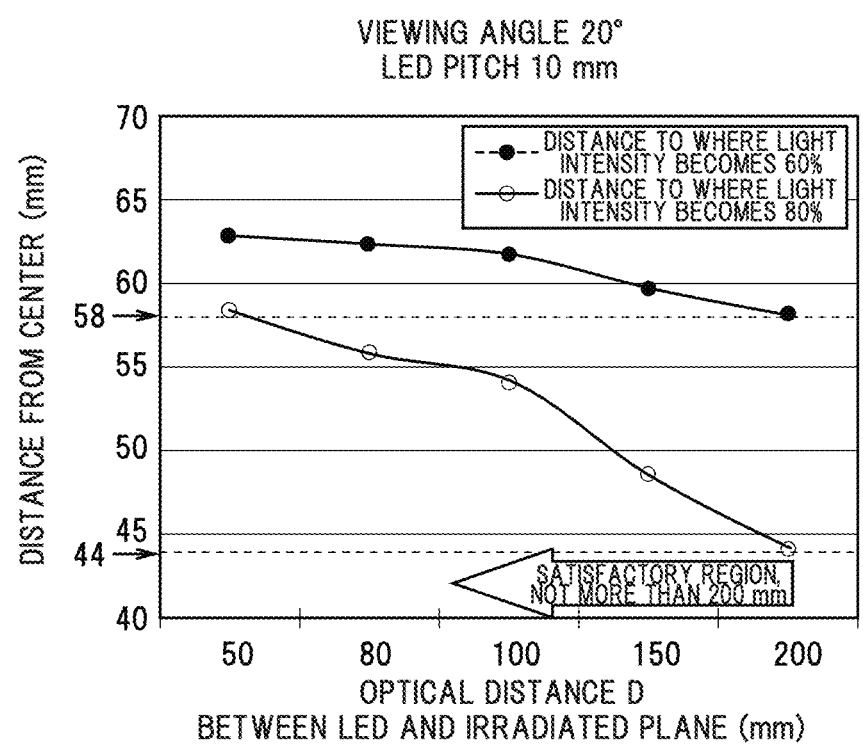

VIEWING ANGLE 140°
D=50mm

VIEWING ANGLE 140°
D=80mm

VIEWING ANGLE 140°
D=100mm

VIEWING ANGLE 140°
D=150mm

VIEWING ANGLE 140°
D=200mm

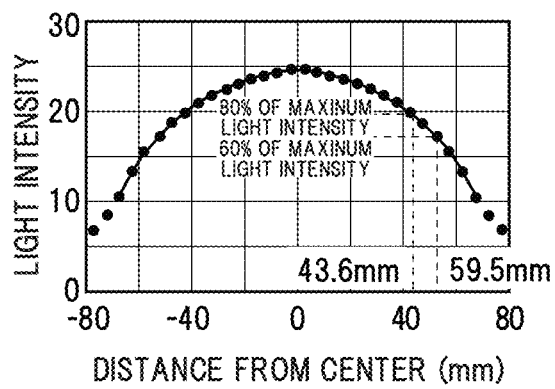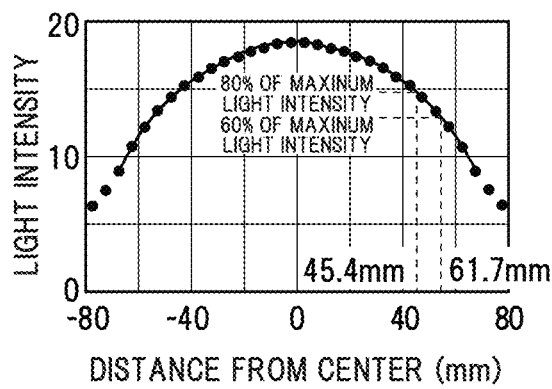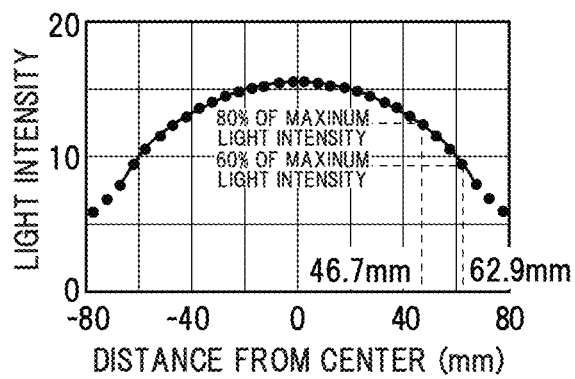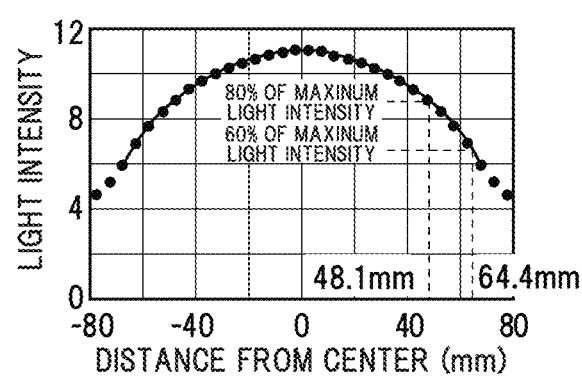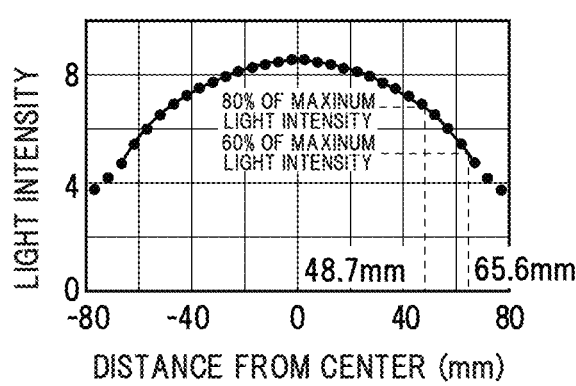

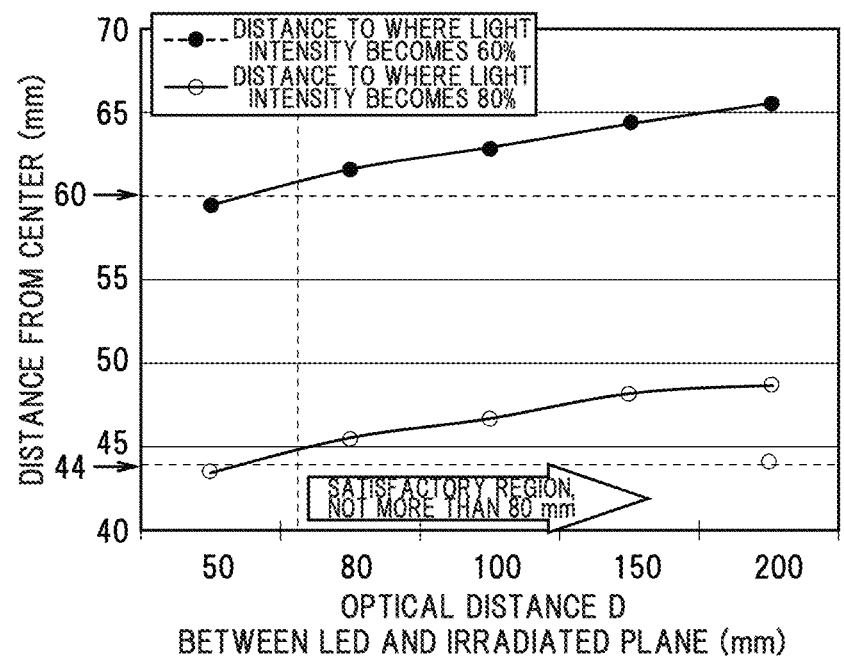

LED PITCH 8.5 mm

LED PITCH 10 mm

LED PITCH 12 mm

LED PITCH 15 mm

LED PITCH 20 mm

VIEWING ANGLE 20°
LED PITCH 8.5 mm

VIEWING ANGLE 20°
LED PITCH 10 mm

VIEWING ANGLE 20°
LED PITCH 12 mm

VIEWING ANGLE 20°
LED PITCH 15 mm

VIEWING ANGLE 20°
LED PITCH 20 mm

VIEWING ANGLE 20°

VIEWING ANGLE 20°

VIEWING ANGLE 140°
LED PITCH 8.5 mm

VIEWING ANGLE 140°
LED PITCH 10 mm

VIEWING ANGLE 140°
LED PITCH 12 mm

VIEWING ANGLE 140°
LED PITCH 15 mm

VIEWING ANGLE 140°
LED PITCH 20 mm

VIEWING ANGLE 140°

VIEWING ANGLE 140°

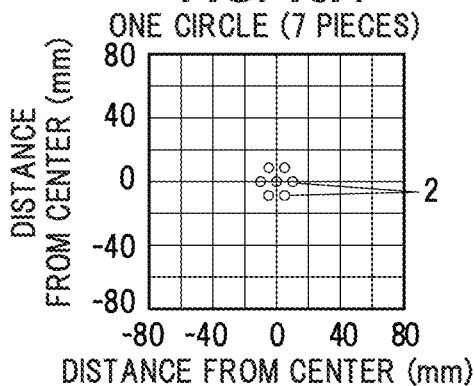
FIG. 18A ONE CIRCLE (7 PIECES)
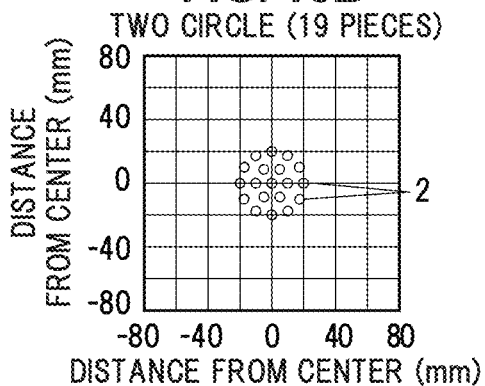
FIG. 18B TWO CIRCLE (19 PIECES)
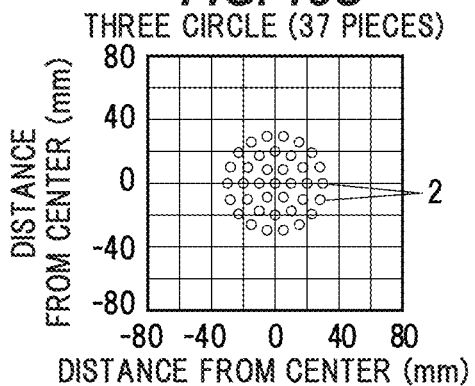
FIG. 18C THREE CIRCLE (37 PIECES)
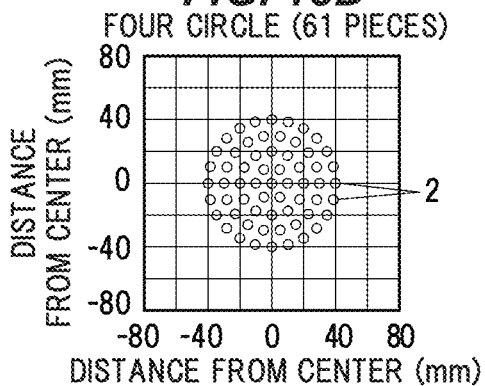
FIG. 18D FOUR CIRCLE (61 PIECES)
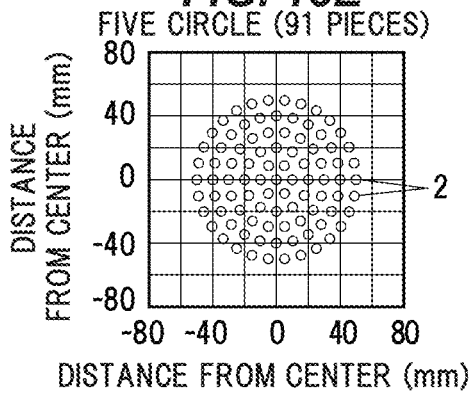
FIG. 18E FIVE CIRCLE (91 PIECES)
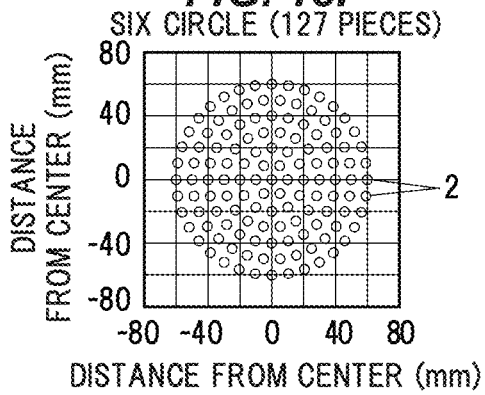
FIG. 18F SIX CIRCLE (127 PIECES)
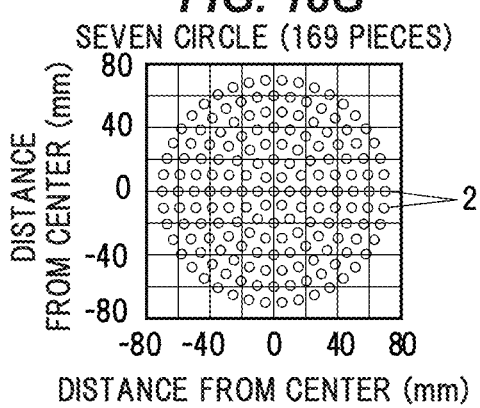
FIG. 18G SEVEN CIRCLE (169 PIECES)

LIGHT SOURCE DEVICE

TECHNICAL FIELD

The present invention relates to a light source device.

BACKGROUND ART

A light source device is known in which plural light-emitting diodes are arranged on a plane (see, e.g., Patent Literature 1). For example, a light source device using light-emitting diodes emitting ultraviolet light is used in a fluid disinfection device to disinfect fluids such as water (to inactivate bacteria) or in a resin curing device to cure ultraviolet curable resins.

CITATION LIST

Patent Literature

Patent Literature 1: JP 5732157 B1

SUMMARY OF INVENTION

Technical Problem

The light source device used in the disinfection device or resin curing device, etc. may be desired to uniformly exposure light to an irradiated plane to be irradiated with light from the light-emitting diode for the purpose of, e.g., providing disinfection of virus or uniformly curing the resin.

Thus, it is a purpose of this invention to provide a light source device enable to provide improved uniformity of light intensity in the irradiated plane.

Solution to Problem

To solve the above problem, the invention provides a light source device, comprising:
a plurality of light-emitting diodes arranged on a plane, wherein a viewing angle of each of the light-emitting diodes is less than 50° or more than 80°.

Advantageous Effects of Invention

According to the invention, it is possible to improve uniformity of light intensity in an irradiated plane.

BRIEF DESCRIPTION OF DRAWINGS

FIG. 3A is a diagram illustrating an arrangement of light-emitting diodes.

FIG. 3B is a diagram illustrating a simulation result of the light intensity distribution when the viewing angle in FIG. 3A is 20°.

FIG. 3C is a diagram illustrating a simulation result of the light intensity distribution when the viewing angle in FIG. 3A is 50°.

FIG. 3D is a diagram illustrating a simulation result of the light intensity distribution when the viewing angle in FIG. 3A is 140°.

FIG. 6A is a graph showing the light intensity distribution of FIG. 5A when viewed in a cross-section passing through the central axis.

FIG. 6B is a graph showing the light intensity distribution of FIG. 5B when viewed in a cross-section passing through the central axis.

FIG. 6C is a graph showing the light intensity distribution of FIG. 5C when viewed in a cross-section passing through the central axis.

FIG. 6D is a graph showing the light intensity distribution of FIG. 5D when viewed in a cross-section passing through the central axis.

FIG. 6E is a graph showing the light intensity distribution of FIG. 5E when viewed in a cross-section passing through the central axis.

FIG. 7 is a graph showing a relationship between the optical distance from the light-emitting diodes to the irradiated plane and the distance from the center to where the light intensity becomes 60% or 80% of the peak value when the viewing angle is 20°.

FIG. 9A is a graph showing the light intensity distribution of FIG. 8A when viewed in a cross-section passing through the central axis.

FIG. 9B is a graph showing the light intensity distribution of FIG. 8B when viewed in a cross-section passing through the central axis.

FIG. 9C is a graph showing the light intensity distribution of FIG. 8C when viewed in a cross-section passing through the central axis.

FIG. 9D is a graph showing the light intensity distribution FIG. 8D when viewed in a cross-section passing through the central axis.

FIG. 9E is a graph showing the light intensity distribution of FIG. 8E when viewed in a cross-section passing through the central axis.

FIG. 10 is a graph showing a relationship between the optical distance from the light-emitting diodes to the irradiated plane and the distance from the center to where the light intensity becomes 60% or 80% of the peak value when the viewing angle is 140°.

FIG. 18A is an explanatory diagram illustrating the arrangement of the light-emitting diodes when the number of the light-emitting diodes used is seven.

FIG. 18B is an explanatory diagram illustrating the arrangement of the light-emitting diodes when the number of the light-emitting diodes is nineteen.

FIG. 18C is an explanatory diagram illustrating the arrangement of the light-emitting diodes when the number of the light-emitting diodes used is thirty-seven.

FIG. 18D is an explanatory diagram illustrating the arrangement of the light-emitting diodes when the number of the light-emitting diodes used is sixty-one.

FIG. 18E is an explanatory diagram illustrating the arrangement of the light-emitting diodes when the number of the light-emitting diodes used is ninety-one.

FIG. 18F is an explanatory diagram illustrating the arrangement of the light-emitting diodes when the number of the light-emitting diodes used is one hundred twenty-seven.

FIG. 18G is an explanatory diagram illustrating the arrangement of the light-emitting diodes when the number of the light-emitting diodes used is one hundred sixty-nine.

DESCRIPTION OF EMBODIMENTS

Embodiment

An embodiment of the invention will be described below in conjunction with the appended drawings.

Figure 1:
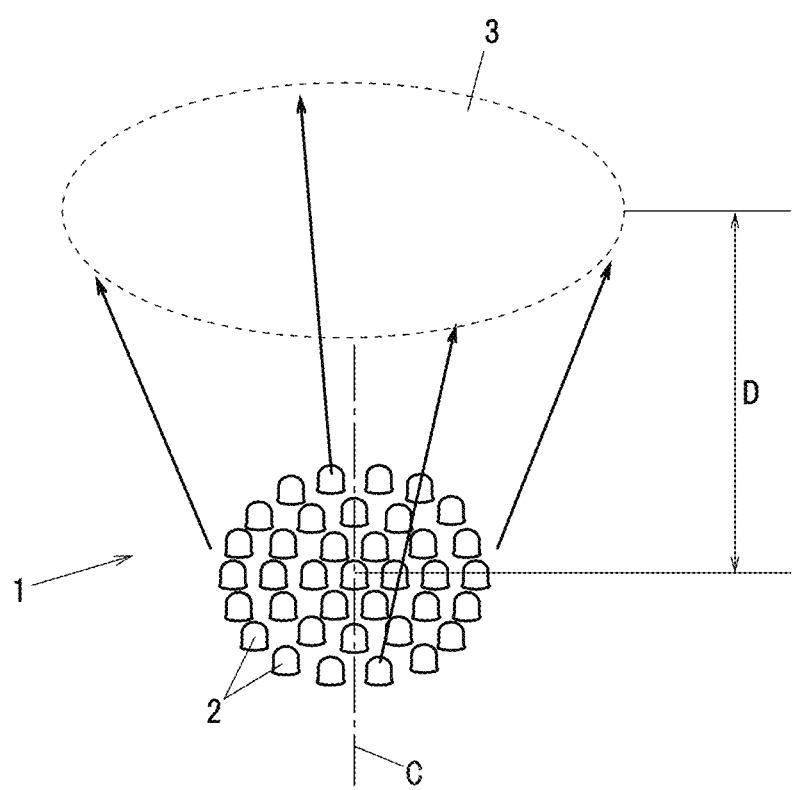
FIG. 1 is a schematic configuration diagram illustrating a light source device in an embodiment of the present invention.

FIG. 1 is a schematic configuration diagram illustrating a light source device in the present embodiment. As shown in FIG. 1, a light source device 1 is a device in which plural light-emitting diodes 2 are arranged on a plane.

A resin-sealed light-emitting diode in which a light-emitting diode chip is sealed with resin is used as the light-emitting diode 2 in this example, but the specific configuration of the light-emitting diode 2 is not specifically limited. For example, the light-emitting diode 2 may be a light-emitting diode in which a light-emitting diode chip is encapsulated in a hollow package covered with a lid of glass, etc., or may be a light-emitting diode in which a chip is not covered, such as chip-on-board. An emission wavelength of the light-emitting diode 2 is also not specifically limited The plural light-emitting diodes 2 are arranged at equal intervals in a circumferential direction and a radial direction about a central axis C perpendicular to the plane on which the plural light-emitting diodes 2 are arranged. Hereafter, an arrangement pitch of light-emitting diodes in the radial direction is referred to as an LED pitch. The specific number of the light-emitting diodes 2 and a preferable arrangement pitch will be discussed later.

An irradiated plane 3 irradiated with light from the light source device 1 here is assumed to be parallel to the plane on which the plural light-emitting diodes 2 are arranged. Hereafter, an optical distance from each light-emitting diode 2 to the irradiated plane 3 along a direction perpendicular to the plane (a direction perpendicular to the irradiated plane 3) is denoted by D. The optical distance is expressed by $D = d \times n$, where d is a distance along a light travel path and n is a refractive index of a medium through which light passes. An object to be irradiated with light from the light source device 1 is not specifically limited and may be any of gas, liquid or solid.

Examination of a Preferable Viewing Angle

A viewing angle of each light-emitting diode 2 of the light source device 1 in the present embodiment is less than 50° or more than 80°. The reasons for this are explained below.

Figure 2A:
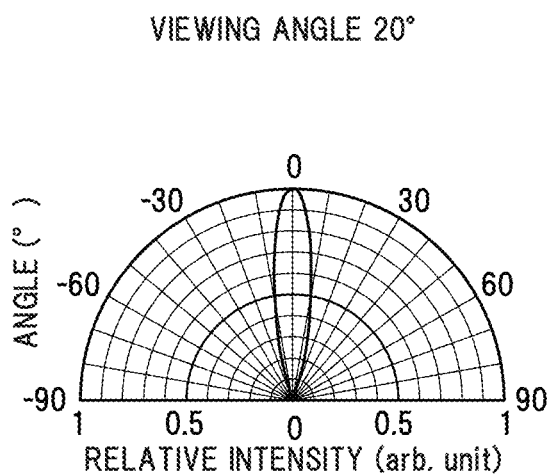
FIG. 2A is a graph showing a relative intensity-angle relationship of a light-emitting diode with a viewing angle of 20°.
Figure 2B:
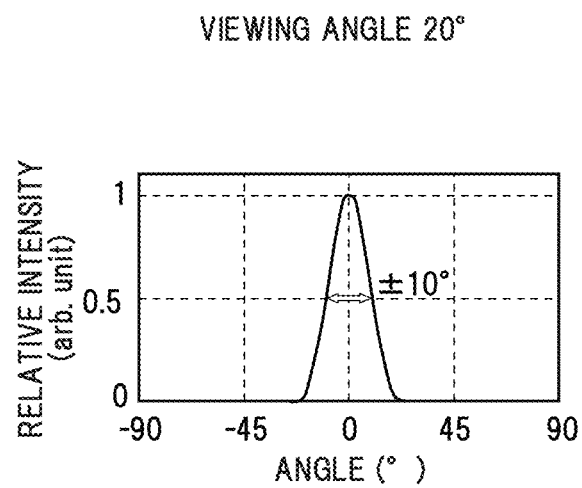
FIG. 2B is a graph showing the relative intensity-angle relationship of the light-emitting diode with a viewing angle of 20°.
Figure 2C:
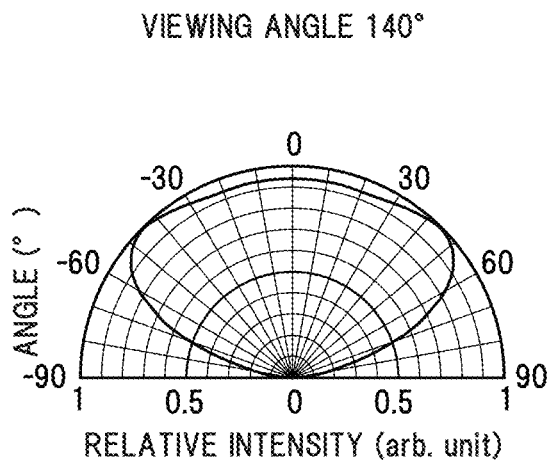
FIG. 2C is a graph showing the relative intensity-angle relationship of a light-emitting diode with a viewing angle of 140°.
Figure 2D:
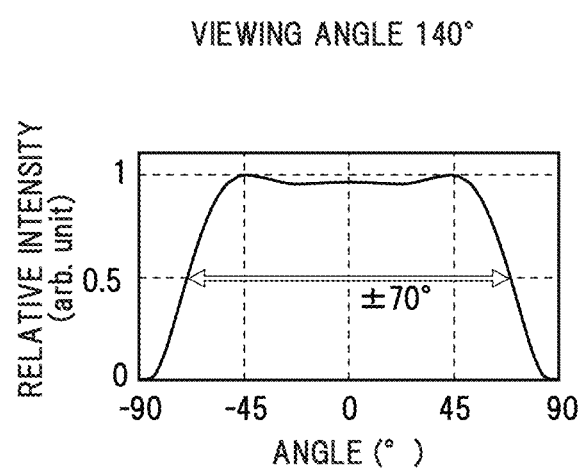
FIG. 2D is a graph showing the relative intensity-angle relationship of the light-emitting diode with a viewing angle of 140°.

The viewing angle, also called a light distribution angle, is an angular range in which light intensity (light intensity) of the light emitting diode 2 is not less than half of its peak value or maximum value. The viewing angle is measured by moving a photodetector while keeping a constant distance from the light-emitting diode 2 and measuring light intensity at each angle. For example, in case of the light-emitting diode 2 with a viewing angle of 20°, the angular range from −10° to +10°, when the front of the light-emitting diode 2 is defined as 0°, is a region where light intensity of not less than half the peak value is obtained, as shown in FIGS. 2A and 2B. In the similar manner, in case of the light-emitting diode 2 with a viewing angle of 140°, the angular range from −70° to +70°, when the front of the light-emitting diode 2 is defined as 0°, is a region where light intensity of not less than half the maximum value, as shown in FIGS. 2C and 2D. In the present specification, the peak value represents the light intensity at the front (0°) and the maximum value represents the value of the largest light intensity.

In this regard, the means for adjusting the viewing angle of the light-emitting diode 2 is not specifically limited. For example, it may have a reflection mechanism such as a reflector in the form of a concave mirror, or it may have a transmissive focusing mechanism such as a lens. It is assumed in the following simulations that all the light-emitting diodes 2 have the same viewing angle, but some errors due to manufacturing tolerances, etc., are allowed.

Next, the following case is examined: the light-emitting diodes 2 are arranged in a 60 mm-diameter range, with one light-emitting diode 2 at the center, at the LED pitch (the arrangement pitch in the radial direction) of 10 mm, as shown in FIG. 3A. Six light-emitting diodes 2 are arranged on a 10 mm-diameter circle, twelve on a 20 mm-diameter circle, eighteen on a 30 mm-diameter circle, twenty-four on a 40 mm-diameter circle, thirty on a 50 mm-diameter circle, and thirty-six on a 60 mm diameter-circle, respectively at equal intervals in the circumferential direction, hence, a total of one hundred twenty-seven light-emitting diodes 2 are used. A radius of a light source region, i.e., a radius of a region in which the light-emitting diodes 2 are arranged, is 60 mm.

Light intensity distribution in the irradiated plane 3 when arranging the light-emitting diodes 2 as shown in FIG. 3A was simulated while changing the viewing angle of each light-emitting diode 2. The light intensity distributions in the irradiated plane in case of the viewing angle of 20°, 50° and 140° are as shown in FIGS. 3B to 3D. In each of FIGS. 3B to 3D, a graph of distribution of light intensity when viewed in a cross-section passing through the central axis C is also shown together with a graph three-dimensionally showing the light intensity distribution. The optical distance D between the light-emitting diodes 2 and the irradiated plane 3 was set to 100 mm. The simulation was performed assuming that intensity (the total amount of emitted light) of one light-emitting diode 2 is the same even when the viewing angle is different. The calculation results for each viewing angle are shown in FIG. 4.

Here, evaluating uniformity of light intensity distribution in the irradiated plane 3 is explained. In applications requiring uniformity of light source, such as water disinfection or resin curing, water disinfection or resin curing performance (effect performance) is improved when output of ultraviolet light is increased, but the improvement is not simply proportional to the increase in the light output and is more than the increase in the light output because a light irradiation region (depth) increases. Therefore, uniformity of the light source needs to be at least not less than 80% to obtain 67% uniformity of the effect performance (within 1.5 times the uniformity of the light intensity), and uniformity of the light source needs to be at least not less than 60% to obtain 50% uniformity of the effect performance (within 2 times the uniformity of the light intensity).

Based on this, in the present embodiment, "a distance from the center to where the light intensity becomes 80% of the peak value" and "a distance from the center to where the light intensity becomes 60% of the peak value" are used as indices to evaluate uniformity of light intensity distribution in the irradiated plane 3. The "center" here means the center of a region in which the light-emitting diodes 2 are arranged, i.e., the position of the central axis C. The larger values of these distances means that the irradiated plane 3 is uniformly irradiated in a wider range and uniformity of the light intensity in the irradiated plane 3 is satisfactory.

Figure 4:
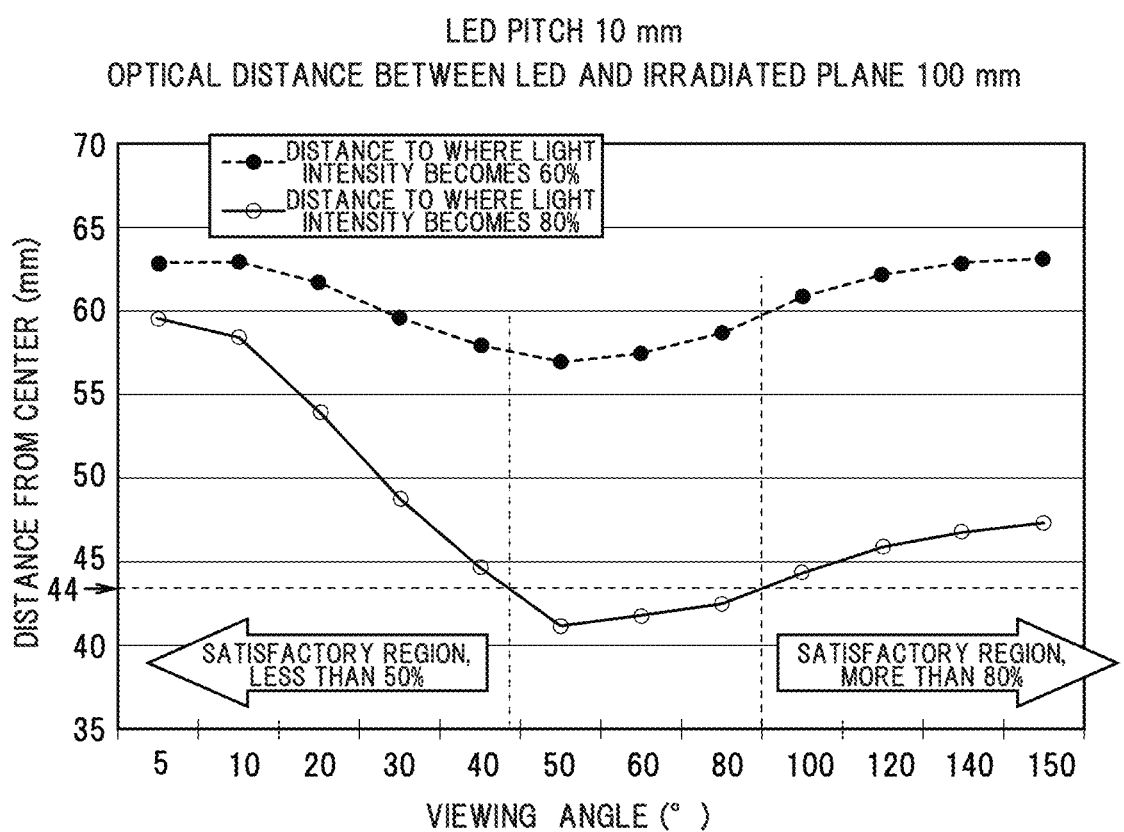
FIG. 4 is a graph showing a relationship between the viewing angle and a distance from the center to where light intensity becomes 60% or 80% of a peak value.
Figure 5A:
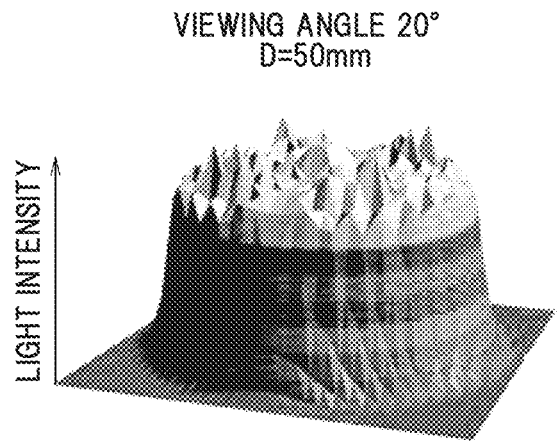
FIG. 5A is a diagram illustrating a simulation result of the light intensity distribution when the viewing angle is 20° and an optical distance from the light-emitting diodes to an irradiated plane is 50 mm.
Figure 5B:
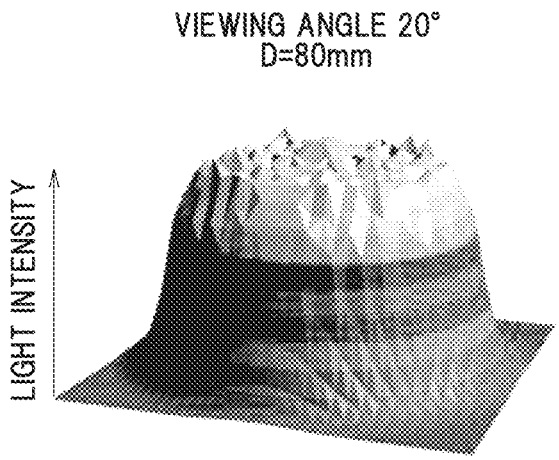
FIG. 5B is a diagram illustrating a simulation result of the light intensity distribution when the viewing angle is 20° and the optical distance from the light-emitting diodes to the irradiated plane is 80 mm.
Figure 5C:
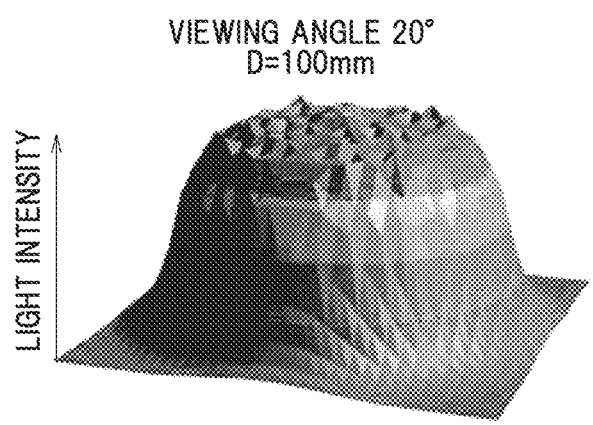
FIG. 5C is a diagram illustrating a simulation result of the light intensity distribution when the viewing angle is 20° and the optical distance from the light-emitting diodes to the irradiated plane is 100 mm.
Figure 5D:
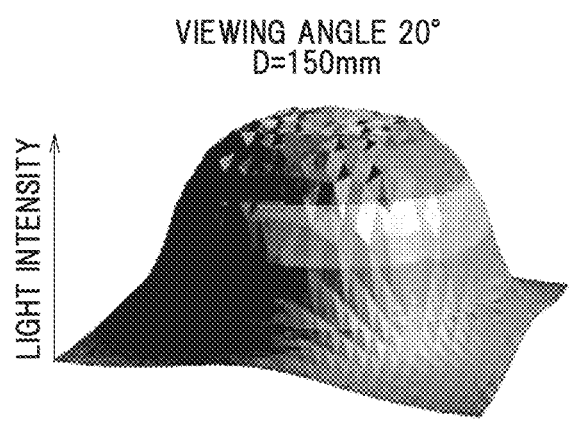
FIG. 5D is a diagram illustrating a simulation result of the light intensity distribution when the viewing angle is 20° and the optical distance from the light-emitting diodes to the irradiated plane is 150 mm.
Figure 5E:
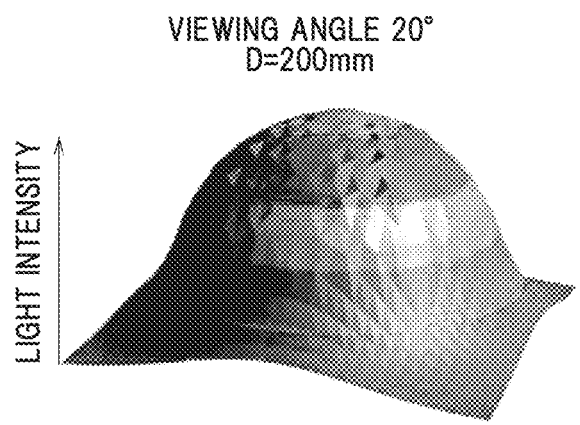
FIG. 5E is a diagram illustrating a simulation result of the light intensity distribution when the viewing angle is 20° and the optical distance from the light-emitting diodes to the irradiated plane is 200 mm.
Figure 8A:
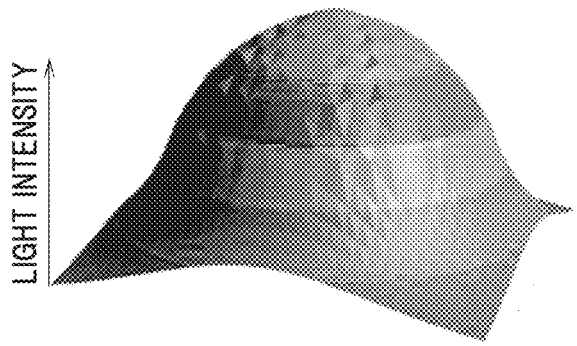
FIG. 8A is a diagram illustrating a simulation result of the light intensity distribution when the viewing angle is 140° and the optical distance from the light-emitting diodes to the irradiated plane is 50 mm.
Figure 8B:
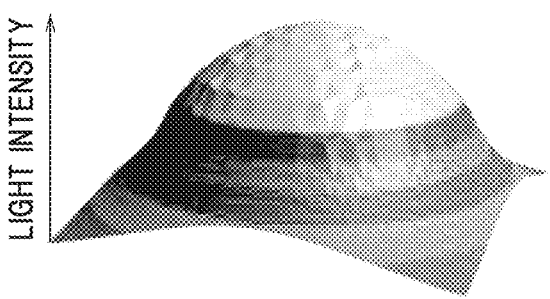
FIG. 8B is a diagram illustrating a simulation result of the light intensity distribution when the viewing angle is 140° and the optical distance from the light-emitting diodes to the irradiated plane is 80 mm.
Figure 8C:
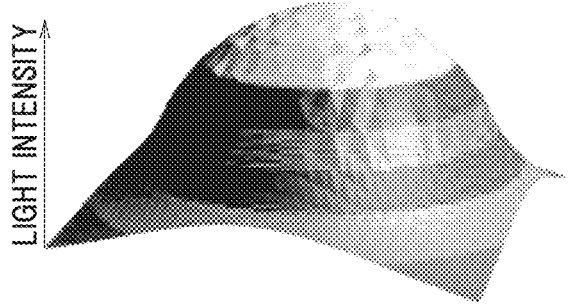
FIG. 8C is a diagram illustrating a simulation result of the light intensity distribution when the viewing angle is 140° and the optical distance from the light-emitting diodes to the irradiated plane is 100 mm.
Figure 8D:
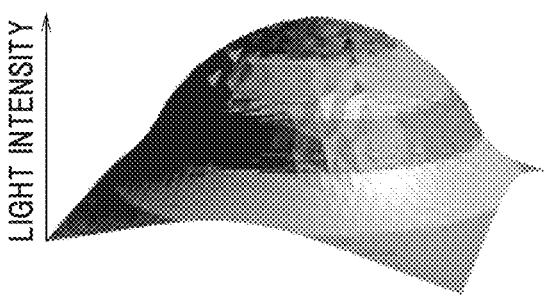
FIG. 8D is a diagram illustrating a simulation result of the light intensity distribution when the viewing angle is 140° and the optical distance from the light-emitting diodes to the irradiated plane is 150 mm.
Figure 8E:
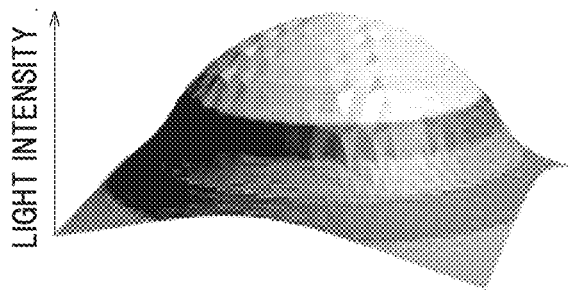
FIG. 8E is a diagram illustrating a simulation result of the light intensity distribution when the viewing angle is 140° and the optical distance from the light-emitting diodes to the irradiated plane is 200 mm.
Figure 11A:
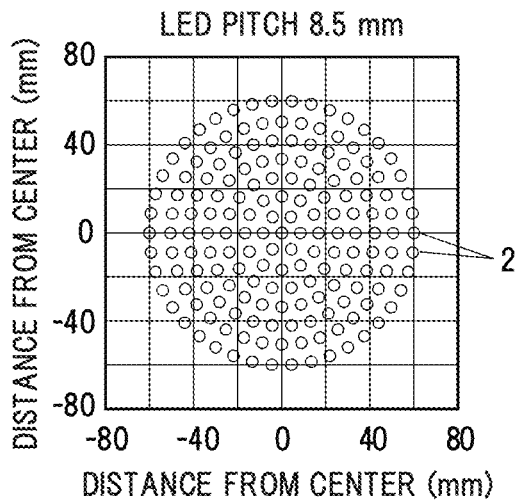
FIG. 11A is an explanatory diagram illustrating the arrangement of the light-emitting diodes when an LED pitch is 8.5 mm.
Figure 11B:
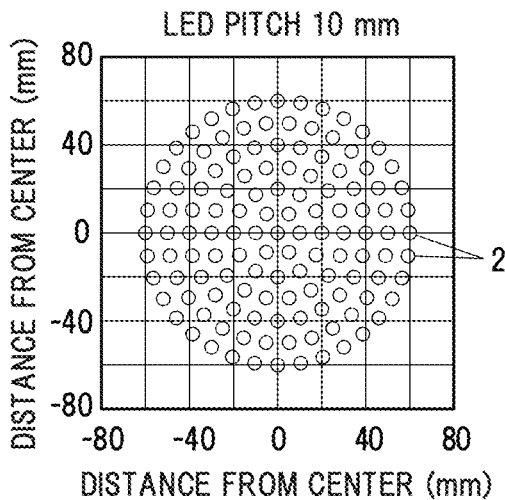
FIG. 11B is an explanatory diagram illustrating the arrangement of the light-emitting diodes when the LED pitch is 10 mm.
Figure 11C:
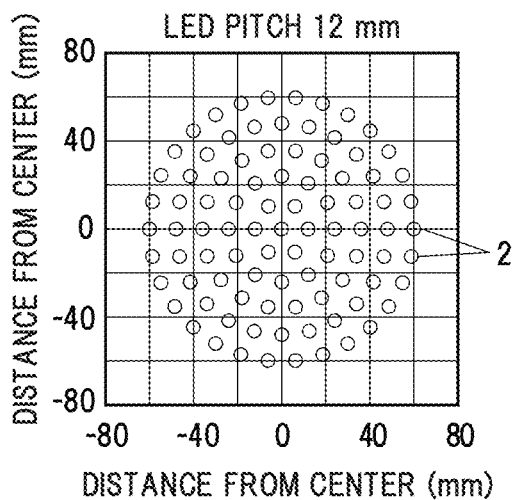
FIG. 11C is an explanatory diagram illustrating the arrangement of the light-emitting diodes when the LED pitch is 12 mm.
Figure 11D:
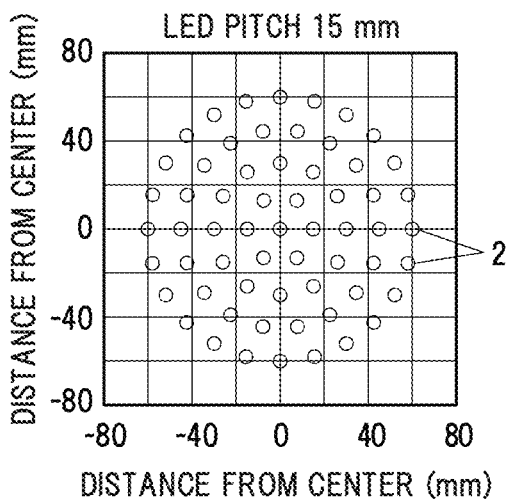
FIG. 11D is an explanatory diagram illustrating the arrangement of the light-emitting diodes when the LED pitch is 15 mm.
Figure 11E:
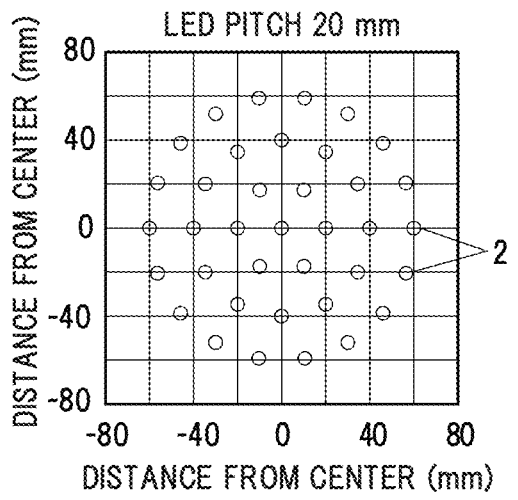
FIG. 11E is an explanatory diagram illustrating the arrangement of the light-emitting diodes when the LED pitch is 20 mm.
Figure 12A:
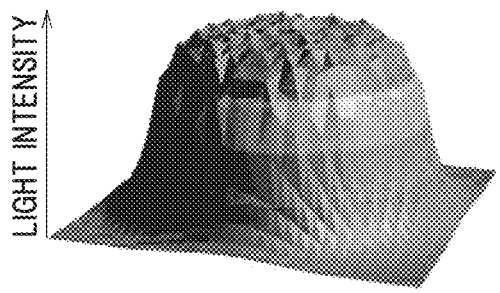
FIG. 12A is a diagram illustrating a simulation result of the light intensity distribution when the viewing angle in FIG. 11A is 20°.
Figure 12B:
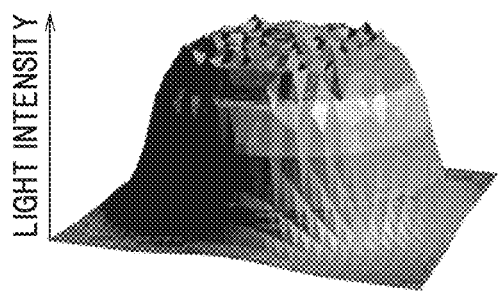
FIG. 12B is a diagram illustrating a simulation result of the light intensity distribution when the viewing angle in FIG. 11B is 20°.
Figure 12C:
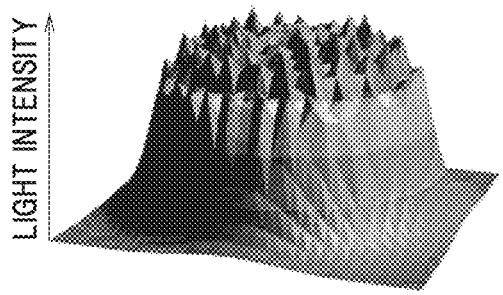
FIG. 12C is a diagram illustrating a simulation result of the light intensity distribution when the viewing angle in FIG. 11C is 20°.
Figure 12D:
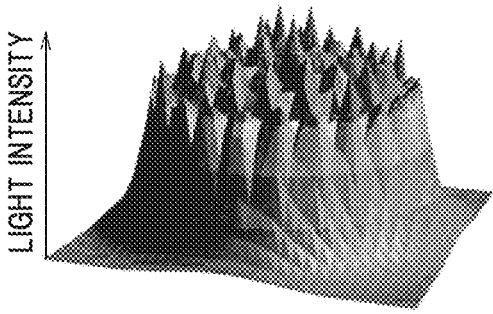
FIG. 12D is a diagram illustrating a simulation result of the light intensity distribution when the viewing angle in FIG. 11D is 20°.
Figure 12E:
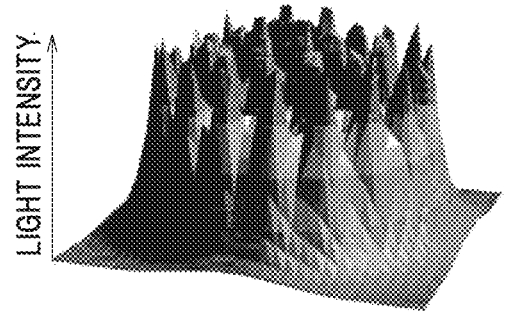
FIG. 12E is a diagram illustrating a simulation result of the light intensity distribution when the viewing angle in FIG. 11E is 20°.
Figure 13A:
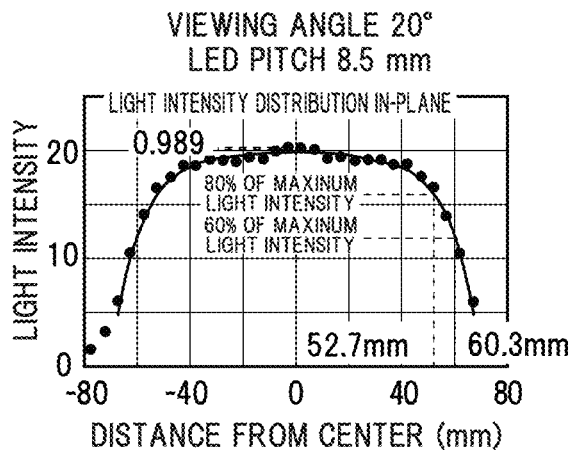
FIG. 13A is a graph showing the light intensity distribution of FIG. 12A when viewed in a cross-section passing through the central axis.
Figure 13B:
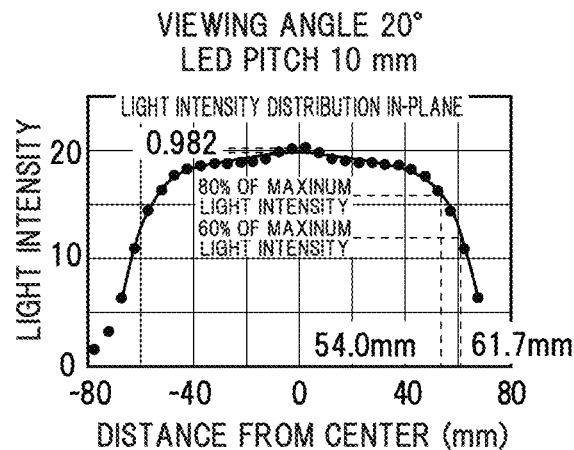
FIG. 13B is a graph showing the light intensity distribution of FIG. 12B when viewed in a cross-section passing through the central axis.
Figure 13C:
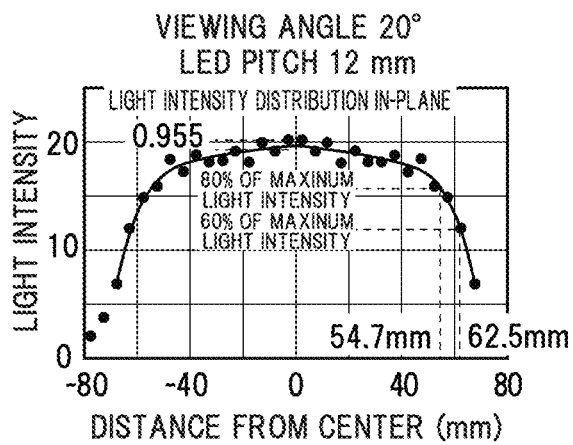
FIG. 13C is a graph showing the light intensity distribution of FIG. 12C when viewed in a cross-section passing through the central axis.
Figure 13D:
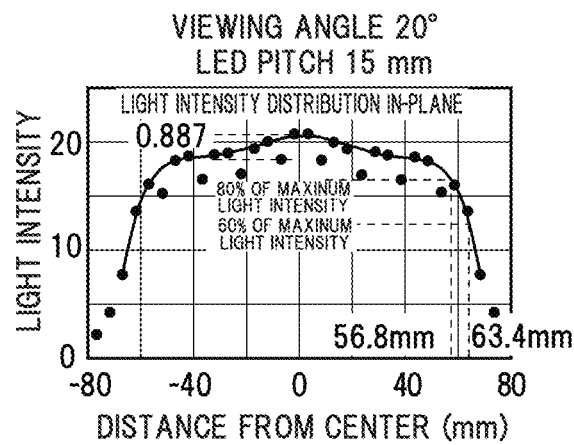
FIG. 13D is a graph showing the light intensity distribution of FIG. 12D when viewed in a cross-section passing through the central axis.
Figure 13E:
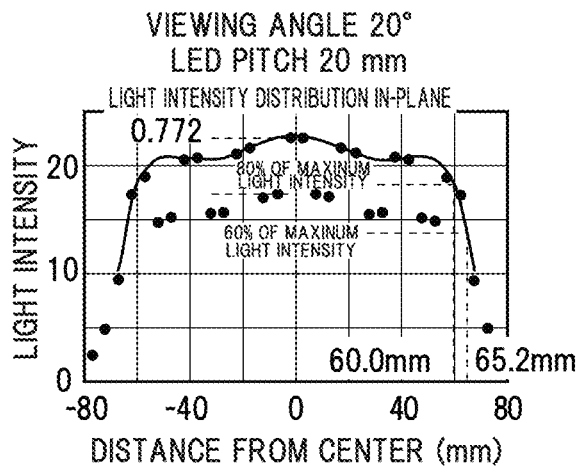
FIG. 13E is a graph showing the light intensity distribution of FIG. 12E when viewed in a cross-section passing through the central axis.

As shown in FIG. 4, satisfactory results are obtained in regions with small and large viewing angles. However, it can be seen that in a region therebetween, i.e., when the viewing angle is 50°, 60° and 80°, "the distance from the center to where the light intensity becomes 80% of the peak value" and "the distance from the center to where the light intensity becomes 60% of the peak value" decrease and uniformity of the light intensity in the irradiated plane 3 decreases.

In the present embodiment, in case that the radius of the light source region is 60 mm, uniformity of the light intensity in the irradiated plane 3 is considered to be acceptable when "the distance from the center to where the light intensity becomes 80% of the peak value" is not less than 44 mm. As shown in FIG. 4, when the viewing angle is less than 50° or more than 80°, "the distance from the center to where the light intensity becomes 80% of the peak value" is not less than 44 mm and uniformity of the light intensity in the irradiated plane 3 is improved. Based on this, the viewing angle of each light-emitting diode 2 of the light source device 1 in the present embodiment is set to less than 50° or more than 80°.

Then, from the graph in FIG. 4, "the distance from the center to where the light intensity becomes 60% of the peak value" corresponding to not less than 44 mm of "the distance from the center to where the light intensity becomes 80% of the peak value" is not less than 58 mm in a region with a viewing angle of less than 50° and is not less than 60 mm in a region with a viewing angle of more than 80°. Therefore, the acceptance criteria were set to not less than 58 mm of "the distance from the center to where the light intensity becomes 80% of the peak value" in case of the viewing angle of less than 50°, and not less than 60 mm of "the distance from the center to where the light intensity becomes 60% of the peak value" in case of the viewing angle of more than 80°.

Examination of the Optical Distance D between the Light-Emitting Diodes 2 and the Irradiated Plane 3

Firstly, a preferable optical distance D when the viewing angle of the light-emitting diode 2 is less than 50° will be examined. Simulations were performed to obtain the light intensity distribution in the irradiated plane 3 when the viewing angle of the light-emitting diode 2 is 20° and the optical distance D between the light-emitting diodes 2 and the irradiated plane 3 is 50 mm, 80 mm, 100 mm, 150 mm and 200 mm. The simulation results are shown in FIGS. 5A to 5E. The light intensity distribution when viewed in the cross-section passing through the central axis C in each case is shown FIGS. 6A to 6E.

In addition, the results of calculating "the distance from the center to where the light intensity becomes 60% of the peak value" and "the distance from the center to where the light intensity becomes 80% of the peak value" from FIGS. 6A to 6E are summarized in FIG. 7. In each case, "the distance from the center to where the light intensity becomes 60% of the peak value" is not less than 58 mm which satisfies the acceptance criterion, as shown in FIG. 7. In addition, in each case, "the distance from the center to where the light intensity becomes 80% of the peak value" is not less than 44 mm which also satisfies the acceptance criterion, as shown in FIG. 7. However, based on the tendency seen in FIG. 7, "the distance from the center to where the light intensity becomes 60% of the peak value" and "the distance from the center to where the light intensity becomes 80% of the peak value" decrease with increasing the optical distance D and are considered to be less than the acceptance criteria if the optical distance D is more than 200 mm.

Therefore, when the viewing angle of each light-emitting diode 2 is less than 50°, the optical distance D from each light-emitting diode 2 to the irradiated plane 3 is desirably not more than 200 mm.

Next, a preferable optical distance D when the viewing angle of the light-emitting diode 2 is more than 80° will be examined. Simulations were performed to obtain the light intensity distribution in the irradiated plane 3 when the viewing angle of the light-emitting diode 2 is 140° and the optical distance D between the light-emitting diodes 2 and the irradiated plane 3 is 50 mm, 80 mm, 100 mm, 150 mm and 200 mm. The simulation results are shown in FIGS. 8A to 8E. The light intensity distribution when viewed in the cross-section passing through the central axis C in each case is shown FIGS. 9A to 9E.

In addition, the results of calculating "the distance from the center to where the light intensity becomes 60% of the peak value" and "the distance from the center to where the light intensity becomes 80% of the peak value" from FIGS. 9A to 9E are summarized in FIG. 10. As shown in FIG. 10, "the distance from the center to where the light intensity becomes 60% of the peak value" and "the distance from the center to where the light intensity becomes 80% of the peak value" are not acceptable when the optical distance D is 50 mm, and are acceptable when the optical distance D is not less than 80 mm.

Therefore, when the viewing angle of each light-emitting diode 2 is more than 80°, the optical distance D from each light-emitting diode 2 to the irradiated plane 3 is desirably not less than 80 mm.

Examination of the LED Pitch

Next, the LED pitch, i.e., the arrangement pitch of the light-emitting diodes 2 in the radial direction, will be examined. Here, the cases where the LED pitch is 8.5 mm, 10 mm, 12 mm, 15 mm and 20 mm as shown in FIGS. 11A to 11E were examined. The diameter of the region in which the light-emitting diodes 2 are arranged (the light source region) was the same and was 60 mm in each case, and the LED pitch was adjusted by increasing or decreasing the number of the arranged light-emitting diodes 2 and thereby adjusting the density. The number of the light-emitting diodes 2 used is 169 when the LED pitch is 8.5 mm, 127 when the LED pitch is 10 mm, 91 when the LED pitch is 12 mm, 61 when the LED pitch is 15 mm, and 37 when the LED pitch is 20 mm. Since the total number of the light-emitting diodes 2 is different for these cases, the simulation was performed assuming that the total light intensity is the same.

Firstly, the case where the viewing angle of the light-emitting diode 2 is less than 50° will be examined. Simulations were performed to obtain the light intensity distribution in the irradiated plane 3 when the viewing angle of the light-emitting diode 2 is 20° and the LED pitch is 8.5 mm, 10 mm, 12 mm, 15 mm and 20 mm. The simulation results are shown in FIGS. 12A to 12E. The light intensity distribution when viewed in the cross-section passing through the central axis C in each case is shown FIGS. 13A to 13E.

Figure 14A:
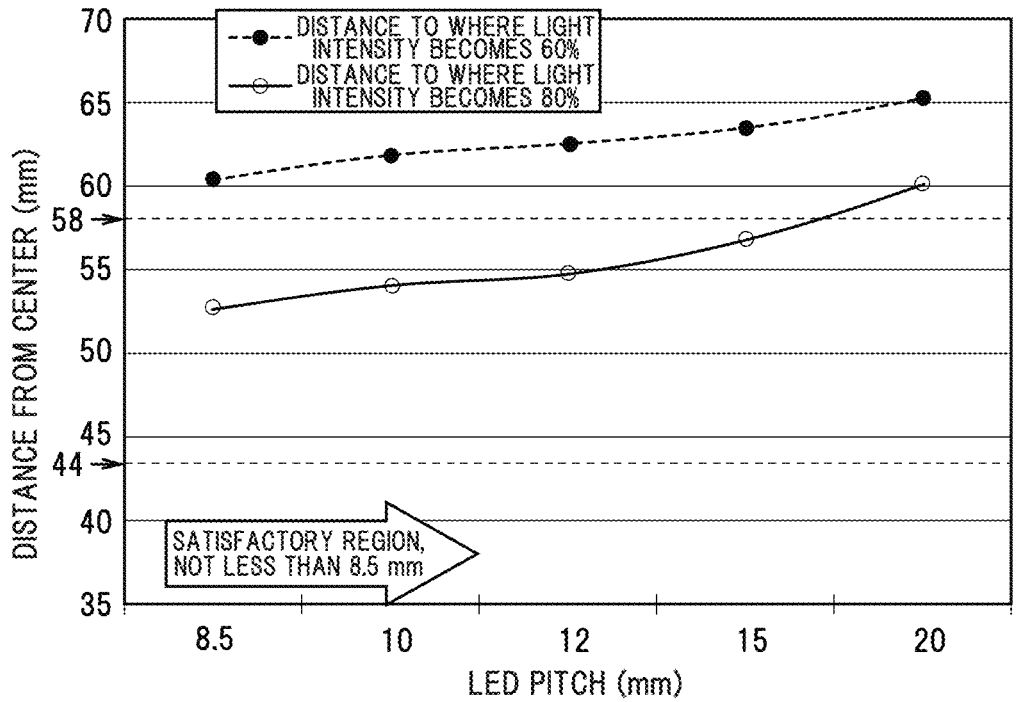
FIG. 14A is a graph showing a relationship between the LED pitch and the distance from the center to where the light intensity becomes 60% or 80% of the peak value when the viewing angle is 20°.

In addition, the results of calculating "the distance from the center to where the light intensity becomes 60% of the peak value" and "the distance from the center to where the light intensity becomes 80% of the peak value" from FIGS. 13A to 13E are summarized in FIG. 14A. In each case, "the distance from the center to where the light intensity becomes 60% of the peak value" is not less than 58 mm which satisfies the acceptance criterion, as shown in FIG. 14A. In addition, in each case, "the distance from the center to where the light intensity becomes 80% of the peak value" is not less than 44 mm which also satisfies the acceptance criterion, as shown in FIG. 14A. Then, based on the tendency seen in FIG. 14A, "the distance from the center to where the light intensity becomes 60% of the peak value" is considered to be less than the acceptable value of 58 mm if the LED pitch is less than 8.5 mm. Therefore, when the viewing angle of each light-emitting diode 2 is less than 50°, the LED pitch is desirably not less than 8.5 mm.

Here, the simulation results in FIGS. 12A to 12E show that the larger the LED pitch, the greater the variation in light intensity within the irradiated plane 3. Therefore, to evaluate this variation in light intensity, an in-plane light intensity distribution ratio in the irradiated plane 3 was used as an evaluation criterion. Using a peak value and a bottom value of a light intensity drop closest to the peak in the light intensity distribution in FIGS. 13A to 13E, the in-plane light intensity distribution ratio was obtained by calculating the peak value/the bottom value. In the present embodiment, the acceptance criterion is the in-plane light intensity distribution ratio of not less than 80% (0.8).

Figure 14B:
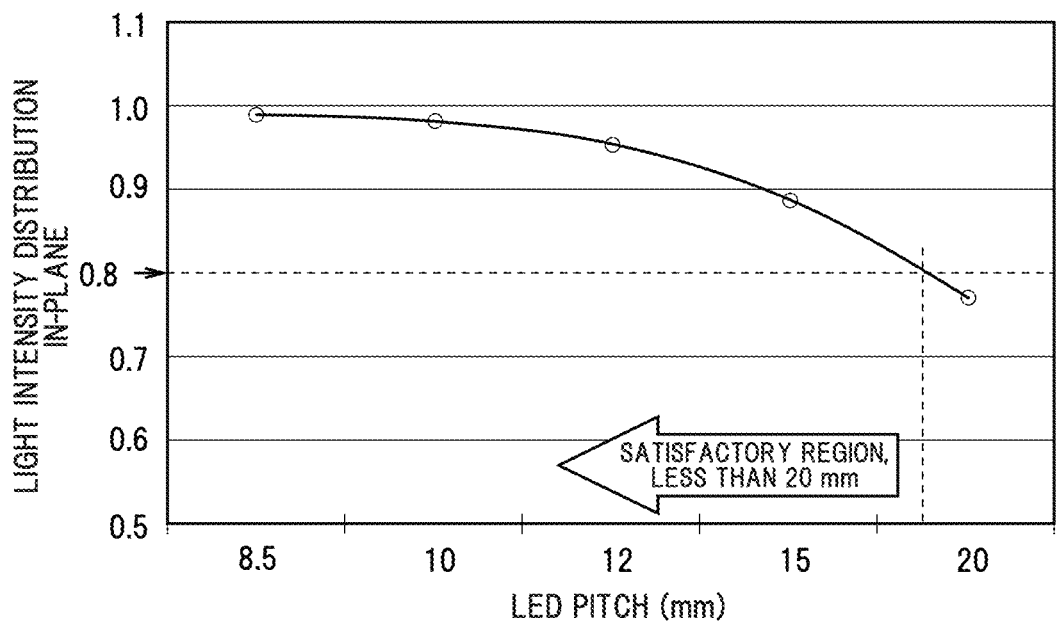
FIG. 14B is a graph showing a relationship between the LED pitch and an in-plane light intensity distribution ratio when the viewing angle is 20°.
Figure 15A:
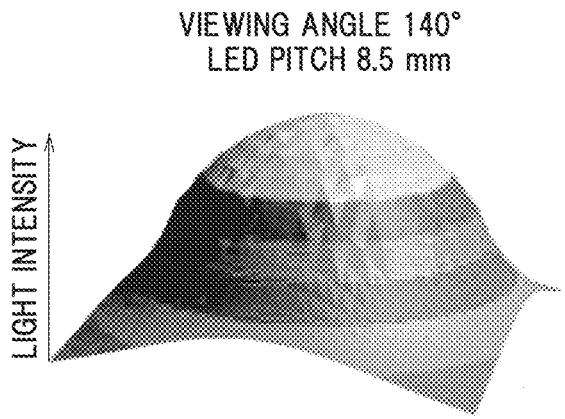
FIG. 15A is a diagram illustrating a simulation result of the light intensity distribution when the viewing angle in FIG. 11A is 140°.
Figure 15B:
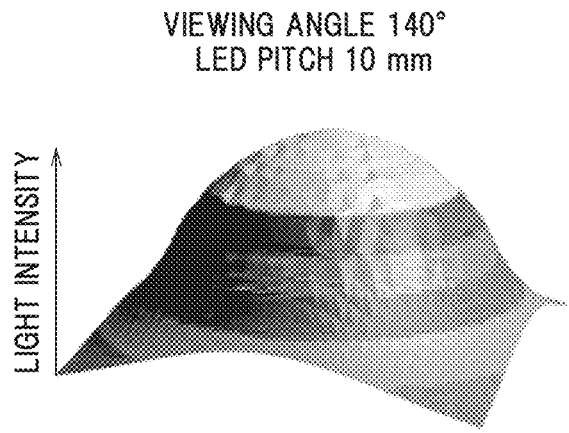
FIG. 15B is a diagram illustrating a simulation result of the light intensity distribution when the viewing angle in FIG. 11B is 140°.
Figure 15C:
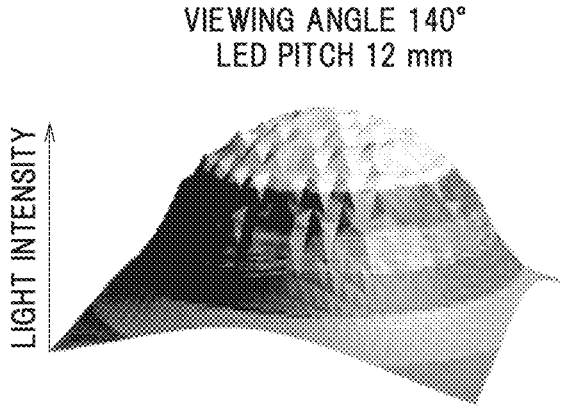
FIG. 15C is a diagram illustrating a simulation result of the light intensity distribution when the viewing angle in FIG. 11C is 140°.
Figure 15D:
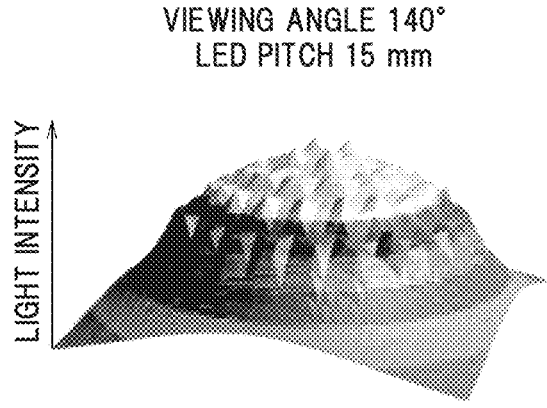
FIG. 15D is a diagram illustrating a simulation result of the light intensity distribution when the viewing angle in FIG. 11D is 140°.
Figure 15E:
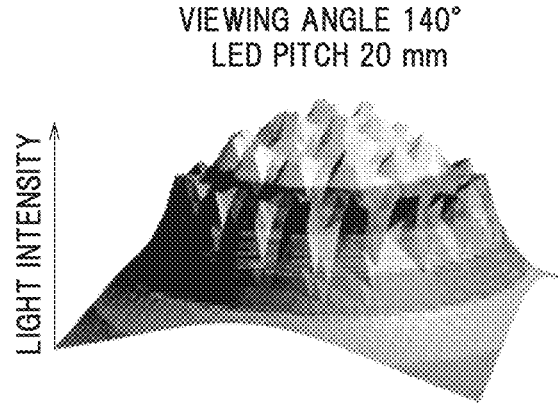
FIG. 15E is a diagram illustrating a simulation result of the light intensity distribution when the viewing angle in FIG. 11E is 140°.
Figure 16A:
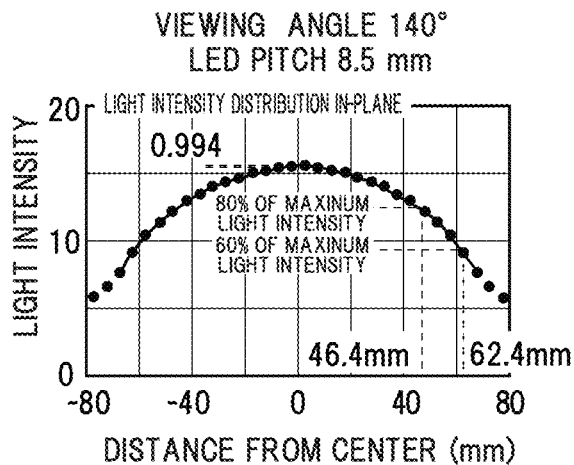
FIG. 16A is a graph showing the light intensity distribution of FIG. 15A when viewed in a cross-section passing through the central axis.
Figure 16B:
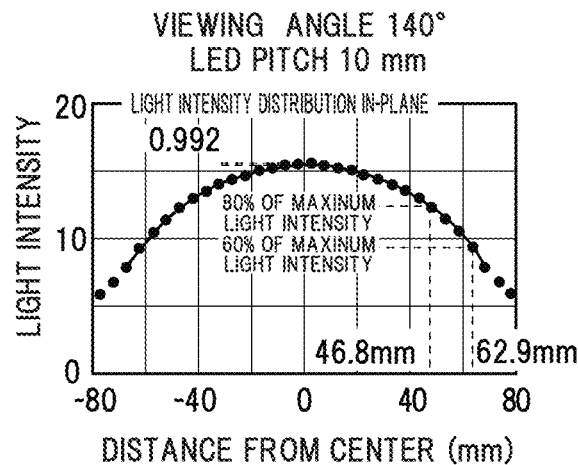
FIG. 16B is a graph showing the light intensity distribution of FIG. 15B when viewed in a cross-section passing through the central axis.
Figure 16C:
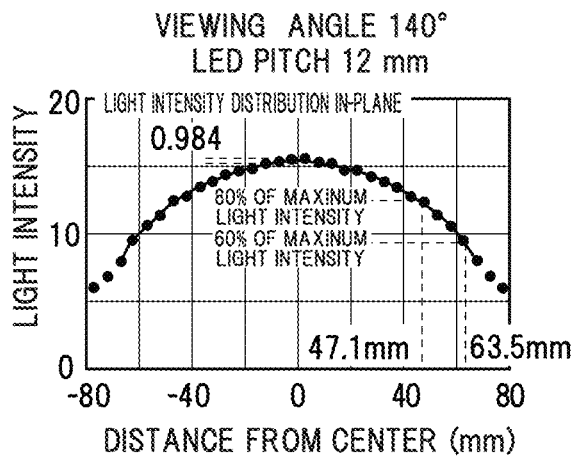
FIG. 16C is a graph showing the light intensity distribution of FIG. 15C when viewed in a cross-section passing through the central axis.
Figure 16D:
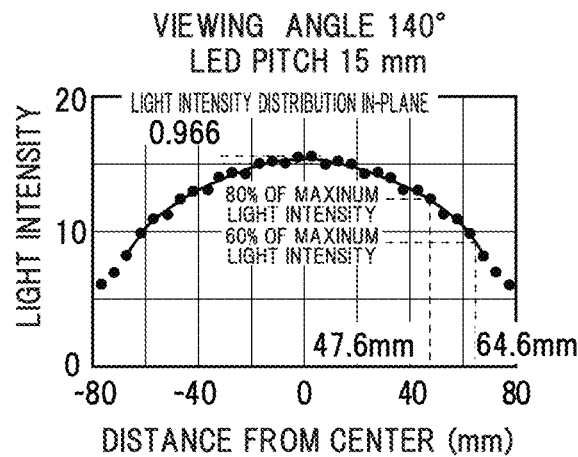
FIG. 16D is a graph showing the light intensity distribution of FIG. 15D when viewed in a cross-section passing through the central axis.
Figure 16E:
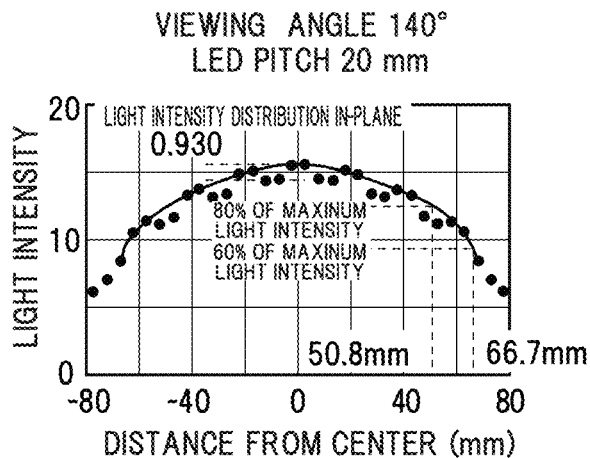
FIG. 16E is a graph showing the light intensity distribution of FIG. 15E when viewed in a cross-section passing through the central axis.

The calculation results of the in-plane light intensity distribution ratio are summarized in FIG. 14B. FIG. 14B shows that the in-plane light intensity distribution ratio is less than 80% when the LED pitch is 20 mm. Therefore, the LED pitch is desirably less than 20 mm, more preferably, not more than 15 mm.

Based on the above results, when the viewing angle of each light-emitting diode 2 is less than 50°, the LED pitch is desirably not less than 8.5 mm and less than 20 mm, more preferably, not less than 8.5 mm and not more than 15 mm.

Next, the case where the viewing angle of the light-emitting diode 2 is more than 80° will be examined. Simulations were performed to obtain the light intensity distribution in the irradiated plane 3 when the viewing angle of the light-emitting diode 2 is 140° and the LED pitch is 8.5 mm, 10 mm, 12 mm, 15 mm and 20 mm. The simulation results are shown in FIGS. 15A to 15E. The light intensity distribution when viewed in the cross-section passing through the central axis C in each case is shown FIGS. 16A to 16E.

Figure 17A:
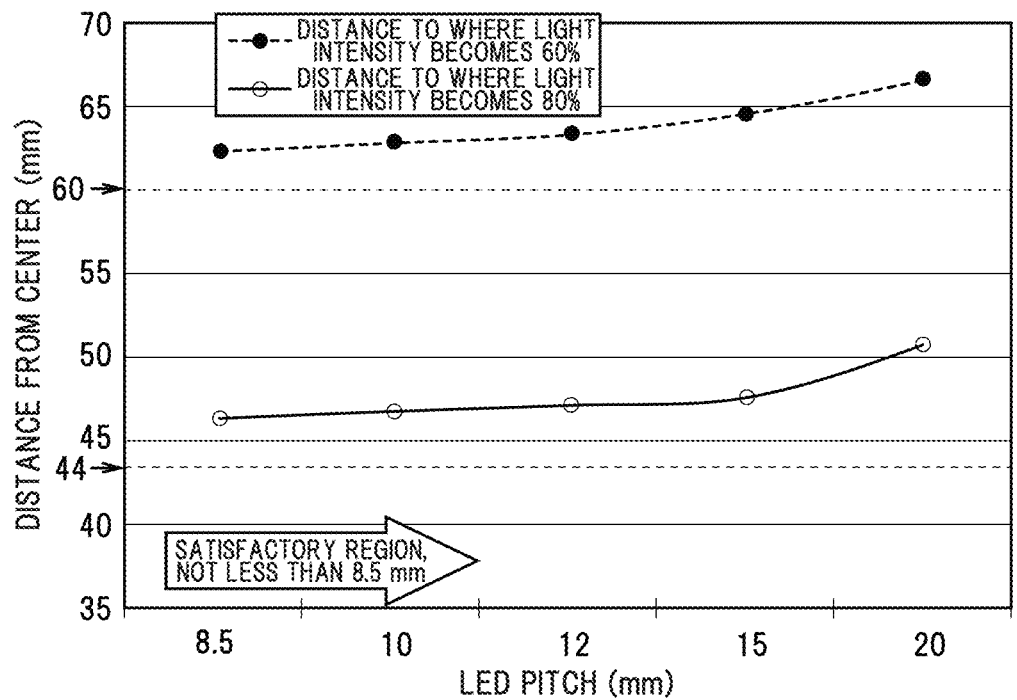
FIG. 17A is a graph showing a relationship between the LED pitch and the distance from the center to where the light intensity becomes 60% or 80% of the peak value when the viewing angle is 140°.

In addition, the results of calculating "the distance from the center to where the light intensity becomes 60% of the peak value" and "the distance from the center to where the light intensity becomes 80% of the peak value" from FIGS. 16A to 16E are summarized in FIG. 17A. In each case, "the distance from the center to where the light intensity becomes 60% of the peak value" is not less than 60 mm which satisfies the acceptance criterion, as shown in FIG. 17A. In addition, in each case, "the distance from the center to where the light intensity becomes 80% of the peak value" is not less than 44 mm which also satisfies the acceptance criterion, as shown in FIG. 17A. Then, based on the tendency seen in FIG. 17A, "the distance from the center to where the light intensity becomes 60% of the peak value" and "the distance from the center to where the light intensity becomes 80% of the peak value" are considered to be less than the acceptable values if the LED pitch is much less than 8.5 mm. Therefore, when the viewing angle of each light-emitting diode 2 is more than 80°, the LED pitch is desirably not less than 8.5 mm.

Figure 17B:
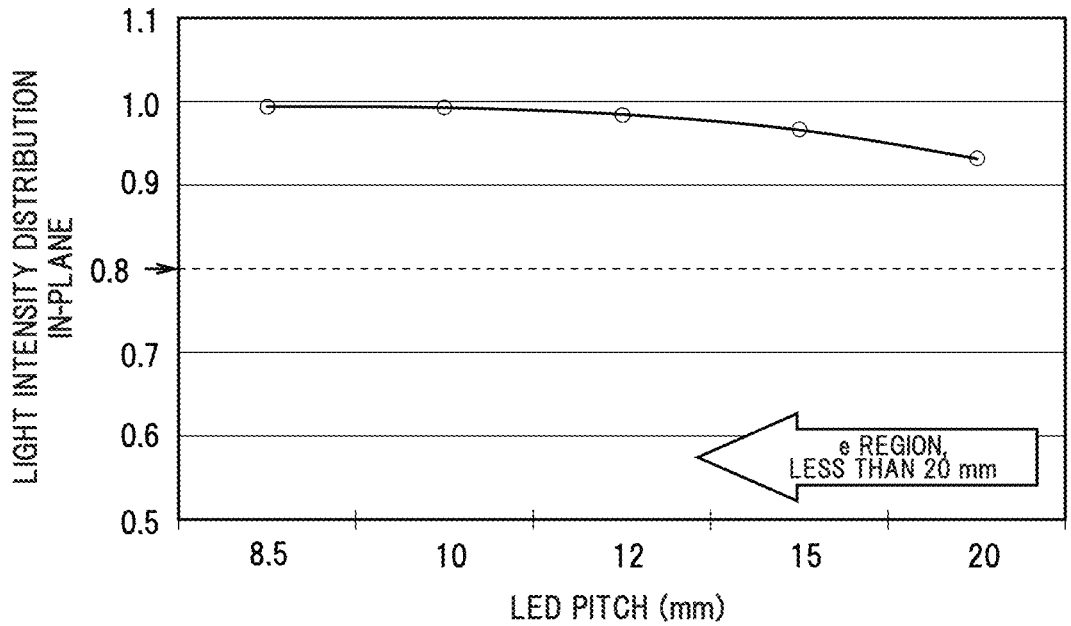
FIG. 17B is a graph showing a relationship between the LED pitch and the in-plane light intensity distribution ratio when the viewing angle is 140°.

The in-plane light intensity distribution ratio in each of the light intensity distributions of FIGS. 16A to 16E was also obtained. The calculation results of the in-plane light intensity distribution ratio are summarized in FIG. 17B. In this example, satisfactory results were obtained regardless of the LED pitch, as shown in FIG. 17B. Then, based on the tendency seen in FIG. 17B, the in-plane light intensity distribution ratio is considered to be less than the acceptable value if the LED pitch is much more than 20 mm. Therefore, the LED pitch is desirably not more than 20 mm.

Based on the above results, when the viewing angle of each light-emitting diode 2 is more than 80°, the LED pitch is desirably not less than 8.5 mm and not more than 20 mm.

Examination of the Number of the Light-Emitting Diodes 2 Used

Next, the case where the LED pitch is the same but the number of the light-emitting diodes 2 used is changed will be examined. Here, the cases where the light-emitting diodes 2 are circularly arranged on one circle, two circles, three circles, four circles, five circles, six circles and seven circles at the same LED pitch of 10 mm around the center light-emitting diode 2 as shown in FIG. 18A to 18G were examined. The number of the light-emitting diodes 2 used is 7 in case of one circle, 19 in case of two circles, 37 in case of three circles, 61 in case of four circles, 91 in case of five circles, 127 in case of six circles, and 169 in case of seven circles.

Simulations in case of the viewing angle of 20° were performed and the light intensity distributions in the cross-section passing through the central axis C were obtained. The simulation results are summarized in FIG. 19A. The vertical axis in FIG. 19A indicates light intensity normalized using the peak value.

Figure 19A:
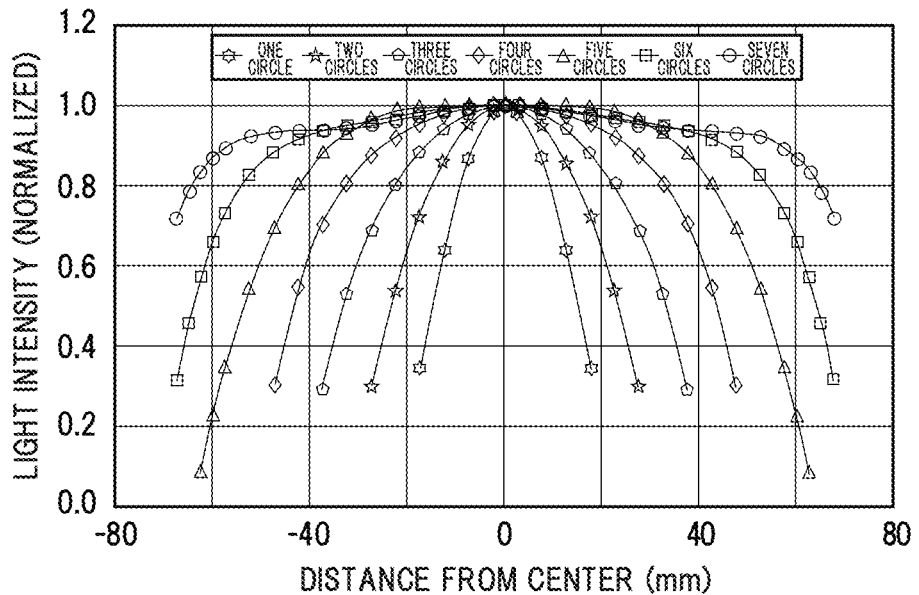
FIG. 19A is a diagram illustrating simulation results of the light intensity distribution when viewed in cross-sections passing through the central axis when the viewing angle is 20°.

The simulation results in FIG. 19A are plotted using the diameters of the light sources actually used in the simulations. Then, the horizontal axis was normalized by dividing the distance from the center indicated on the horizontal axis in FIG. 19A by the radius of the light source region (the radius of the region in which the light-emitting diodes 2 are arranged). The radius of the light source region is 10 mm in case of one circle, 20 mm in case of two circles, 30 mm in case of three circles, 40 mm in case of four circles, 50 mm in case of five circles, 60 mm in case of six circles, and 70 mm in case of seven circles, as shown in FIGS. 18A to 18G.

Figure 19B:
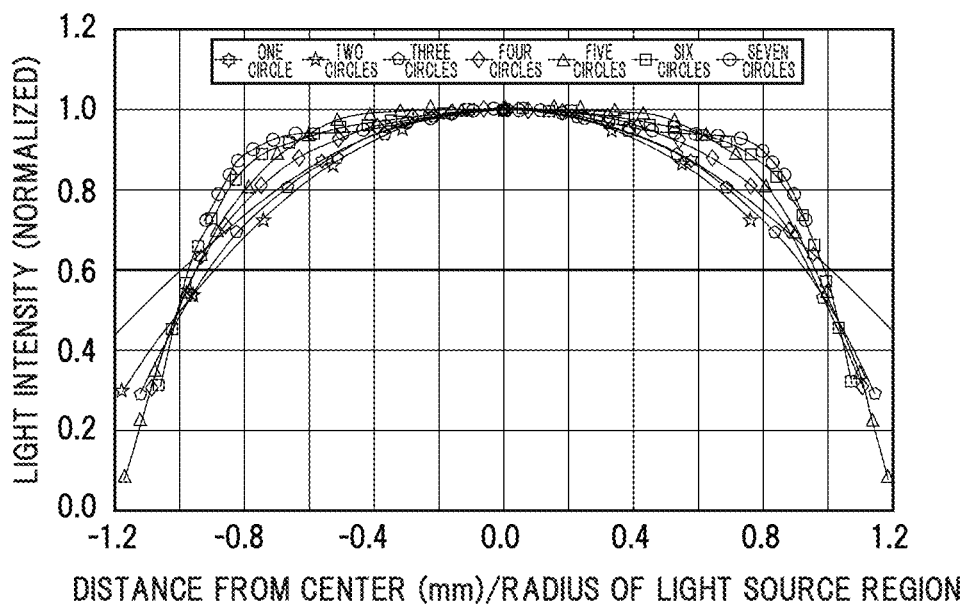
FIG. 19B is a graph obtained by normalizing the horizontal axis of FIG. 19A using a radius of a light source region.

The simulation results after normalization of the horizontal axis are shown in FIG. 19B. FIG. 19B shows that the distance to where the light intensity becomes 60% of the peak value (the distance from the center/the radius of the light source region) is substantially the same, regardless of the number of light-emitting diodes used.

Figure 20A:
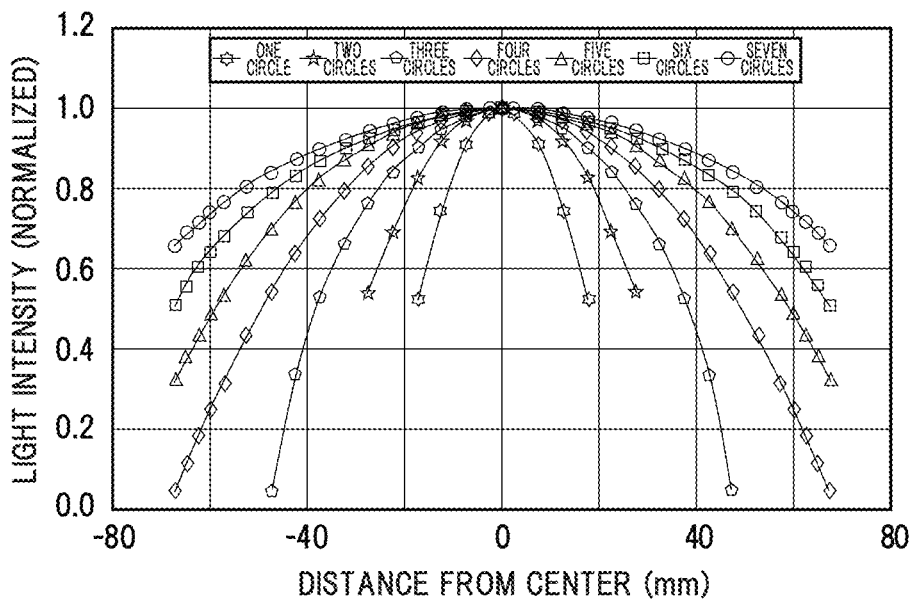
FIG. 20A is a diagram illustrating simulation results of the light intensity distribution when viewed in cross-sections passing through the central axis when the viewing angle is 140°.
Figure 20B:
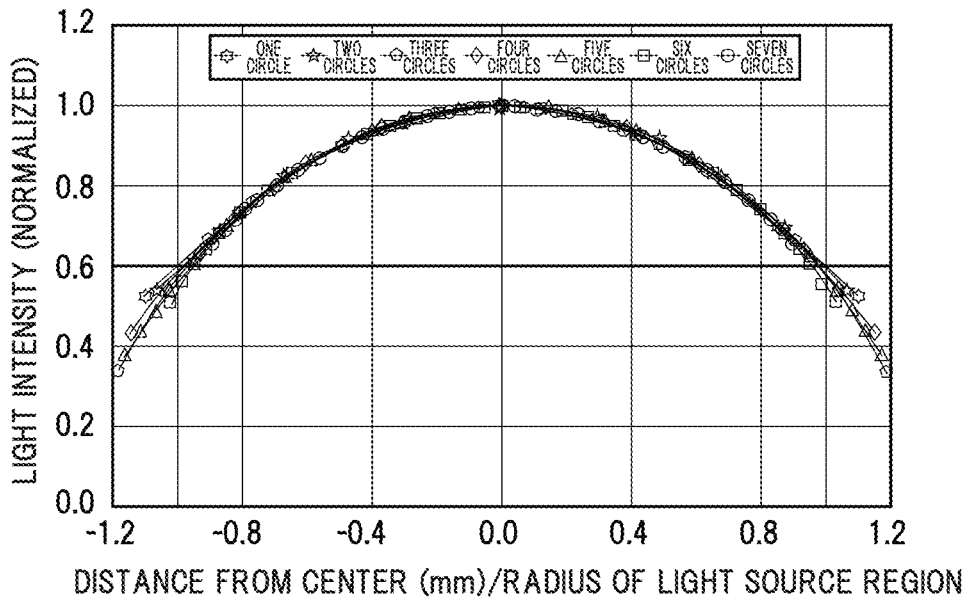
FIG. 20B is a graph obtained by normalizing the horizontal axis of FIG. 20A using the radius of the light source region.

In the same manner, the simulation results when the viewing angle is 140° are shown in FIG. 20A and the graph after normalization of the horizontal axis thereof is shown in FIG. 20B. FIG. 20B shows that the relationship between the normalized light intensity and the normalized distance (the distance from the center/the radius of the light source region) is substantially the same when the viewing angle is 140°.

From the above, it was found that the number of the light-emitting diodes 2 used does not contribute to uniformity of the light intensity in the irradiated plane 3 when the LED pitch is the same. In other words, the evaluation in the present embodiment was found to be valid regardless of the number of the light-emitting diodes 2.

More Desirable Conditions

The above simulation results are summarized as follows: to further improve uniformity of light intensity in the irradiated plane 3, it is desirable to satisfy either of the following conditions (1) and (2).

(1) The viewing angle of each light-emitting diode is less than 50°, the optical distance D from each light-emitting diode 2 to the irradiated plane 3 is not more than 200 mm, and the LED pitch is not less than 8.5 mm and less than 20 mm.

(2) The viewing angle of each light-emitting diode is more than 80°, the optical distance D from each light-emitting diode 2 to the irradiated plane 3 is not less than 80 mm, and the LED pitch is not less than 8.5 mm and not more than 20 mm.

Functions and Effects of the Embodiment

As described above, the light source device 1 in the present embodiment is a device in which plural light-emitting diodes 2 are arranged on a plane and the viewing angle of each light-emitting diode 2 is less than 50° or more than 80°. As a result, it is possible to improve uniformity of the light intensity in the irradiated plane 3. Although the embodiment of the invention has been described, the invention according to claims is not to be limited the embodiment described above. In addition, please note that not all combinations of the features described in the embodiment are necessary to solve the problem of the invention.

The invention can be appropriately modified and implemented without departing from the gist thereof. For example, although the simulations in the above-described embodiment were performed assuming that all the light-emitting diodes 2 have the same viewing angle, it is not essential that all the light-emitting diodes 2 have the same viewing angle.

In addition, although the position of the irradiated plane 3 (the optical distance D from the light-emitting diodes 2 to the irradiated plane 3) is specified in the above-described embodiment, light irradiation to the object only needs to be performed at a position including the irradiated plane 3, and light irradiation to the object may be also performed, e.g., in regions located before and after the irradiated plane 3. As an example, when disinfection of running water (or inactivation of bacteria) is performed by irradiation with ultraviolet light from the light-emitting diodes 2, the running water is irradiated with the ultraviolet light also before and after the set irradiated plane 3, and such a case is also included in the invention. In this example, imperfect disinfection can be suppressed by emitting the ultraviolet light so that light intensity in a certain set irradiated plane 3 is uniform. The intended use of the light source device 1 is not limited to disinfection applications, and it can be applied to, e.g., a resin curing device to cure ultraviolet curable resin or a lighting device which emits visible light, etc.

Although the case where the plural light-emitting diodes 2 are arranged at equal intervals in the circumferential direction and the radial direction has been described in the embodiment, it is not necessarily essential that the light-emitting diodes 2 are arranged at equal intervals, and as described in the embodiment, the pitch of the light-emitting diodes may be appropriately changed within a range allowing uniformity of the light intensity in the irradiated plane 3 to be maintained. In addition, the light-emitting diodes 2 do not need to be arranged in a circular shape as a whole, and may be arranged, e.g., in a rectangular shape as a whole.

REFERENCE SIGNS LIST

1 LIGHT SOURCE DEVICE
2 LIGHT-EMITTING DIODE
3 IRRADIATED PLANE

The invention claimed is:

1. A light source device, comprising:
a plurality of light-emitting diodes arranged on a plane, wherein a viewing angle of each of the plurality of light-emitting diodes is less than 50° or more than 80°, wherein
the plurality of light-emitting diodes are arranged circularly around a center point of the plane, wherein
the plurality of light-emitting diodes are arranged at equal intervals in a circumferential direction and a radial direction about a central axis perpendicular to the plane, and wherein
at a position where a light intensity becomes 60% of a peak value on an irradiated plane that is parallel to the plane, a value obtained by dividing a distance along the irradiated plane from the central axis to the position by a distance from the center point of the plane to a light-emitting diode of the plurality of light-emitting diodes that is farthest from the center point of the plane is not less than −0.9 and not more than 0.9.

2. The light source device according to claim 1, wherein the viewing angle of each of the plurality of light-emitting diodes is less than 50°, and wherein an optical distance along a direction perpendicular to the plane, from each of the plurality of light-emitting diodes to the irradiated plane parallel to the plane which is irradiated with light from each of the plurality of light-emitting diodes, is not more than 200 mm.

3. The light source device according to claim 1, wherein the viewing angle of each of the plurality of light-emitting diodes is less than 50°, and wherein a pitch of the arrangement of the plurality of light-emitting diodes in the radial direction is not less than 8.5 mm and less than 20 mm.

4. The light source device according to claim 1, wherein the viewing angle of each of the plurality of light-emitting diodes is more than 80°, and wherein an optical distance along a direction perpendicular to the plane, from each of the plurality of light-emitting diodes to the irradiated plane parallel to the plane which is irradiated with light from each of the plurality of light-emitting diodes, is not less than 80 mm.

5. The light source device according to claim 1, wherein the viewing angle of each of the plurality of light-emitting diodes is more than 80°, and wherein a pitch of the arrangement of the plurality of light-emitting diodes in the radial direction is not less than 8.5 mm and not more than 20 mm.

6. The light source device according to claim 1, wherein a second distance from the central axis to a position along the irradiated plane where light intensity becomes 80% of peak value is not less than 44 mm.

7. The light source device according to claim 1, wherein, in a state that the viewing angle is less than 50°, the distance from the central axis to the position along the irradiated plane where light intensity becomes 60% of peak value is not less than 58 mm.

8. The light source device according to claim 1, wherein, in a state that the viewing angle is more than 80°, the distance from the central axis to the position along the irradiated plane where light intensity becomes 60% of peak value is not less than 60 mm.

9. The light source device according to claim 1, wherein a center light-emitting diode of the plurality of light-emitting diodes is positioned at the center point of the plane.

* * * * *